United States Patent
Liu et al.

(10) Patent No.: US 10,496,051 B2
(45) Date of Patent: Dec. 3, 2019

(54) EVENT ANALYZING DEVICE, EVENT ANALYZING SYSTEM, EVENT ANALYZING METHOD, AND NON-TRANSITORY COMPUTER READABLE STORAGE MEDIUM

(71) Applicant: Yokogawa Electric Corporation, Tokyo (JP)

(72) Inventors: Zhuo Liu, Tokyo (JP); Yuichi Sakuraba, Tokyo (JP)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 1 day.

(21) Appl. No.: 15/885,947

(22) Filed: Feb. 1, 2018

(65) Prior Publication Data

US 2018/0224809 A1 Aug. 9, 2018

(30) Foreign Application Priority Data

Feb. 8, 2017 (JP) .................................. 2017-021434

(51) Int. Cl.
    *G05B 13/02* (2006.01)
    *G05B 13/04* (2006.01)
    (Continued)

(52) U.S. Cl.
    CPC ....... *G05B 13/0265* (2013.01); *G05B 13/048* (2013.01); *G05B 19/0423* (2013.01);
    (Continued)

(58) Field of Classification Search
    CPC ............ G05B 13/0265; G05B 19/4183; G05B 19/0423; G05B 13/048; G05B 19/409;
    (Continued)

(56) References Cited

U.S. PATENT DOCUMENTS

2004/0243347 A1* 12/2004 Lehman .................. B21B 37/50
                                                             702/182
2010/0082125 A1*  4/2010 Pingel ................ G05B 23/0272
                                                             700/47
(Continued)

FOREIGN PATENT DOCUMENTS

EP       2 386 991 A1    11/2011
JP     2007-316681 A     12/2007
(Continued)

OTHER PUBLICATIONS

Kenji et al. ("Implementation of Operator Support System using Dynamic Simulator for Abnormal Plant Condition," CIMCA-IAWTIC, 2006) (Year: 2006).*

*Primary Examiner* — Yasser A Abdelaziez
(74) *Attorney, Agent, or Firm* — Sughrue Mion, PLLC

(57) ABSTRACT

An event analyzing device includes an event collector configured to collect log data of a manual operation event performed by an operator of a plant, an event analyzer configured to analyze a manual operation method or a manual operation intention of the manual operation event based on the log data, a manual operation sequence extractor configured to extract the manual operation method or the manual operation intention for each predetermined period as manual operation sequences in order of time, a manual operation sequence classifier configured to classify the manual operation sequences in which manual operations are in a similar order from among the manual operation sequences, a manual operation procedure constructor configured to construct a manual operation procedure of the operator based on the manual operation sequences, a process data collector configured to collect process data of the plant, and a manual operation condition estimator configured to estimate an execution condition under which manual opera- (Continued)

tions of the manual operation procedure constructed are performed.

20 Claims, 13 Drawing Sheets

(51) Int. Cl.
*G05B 19/042* (2006.01)
*G05B 19/418* (2006.01)
*G05B 19/409* (2006.01)
*G06N 20/00* (2019.01)

(52) U.S. Cl.
CPC ........ *G05B 19/4183* (2013.01); *G05B 19/409* (2013.01); *G05B 2219/23319* (2013.01); *G06N 20/00* (2019.01)

(58) Field of Classification Search
CPC ...... G05B 2219/23319; G06F 11/3476; G06N 20/00
See application file for complete search history.

(56) References Cited

U.S. PATENT DOCUMENTS

| | | | |
|---|---|---|---|
| 2011/0035693 A1 | 2/2011 | Ueno et al. | |
| 2012/0271587 A1* | 10/2012 | Shibuya | G05B 23/0229 702/127 |
| 2014/0188779 A1* | 7/2014 | Sakuraba | G05B 23/0275 706/52 |
| 2014/0317040 A1* | 10/2014 | Liu | G06K 9/6296 706/46 |
| 2017/0023945 A1* | 1/2017 | Cavalcanti | G08G 1/0116 |
| 2017/0132104 A1* | 5/2017 | Liu | G06F 11/3476 |
| 2017/0132291 A1* | 5/2017 | Liu | G06F 7/08 |

FOREIGN PATENT DOCUMENTS

| | | |
|---|---|---|
| JP | 2011-237952 A | 11/2011 |
| JP | 2013-020426 A | 1/2013 |
| WO | 2009/125817 A1 | 10/2009 |

* cited by examiner

| EVENT ID | DATE AND TIME | TAG NAME | MANUAL OPERATION TYPE | PREVIOUS VALUE | CURRENT VALUE |
|---|---|---|---|---|---|
| 1 | 2015/8/21 10:00:00 | TAG1 | MAN | AUT | MAN |
| 2 | 2015/8/21 10:00:10 | TAG1 | MV | 25.0 | 30.0 |
| 3 | 2015/8/21 10:00:30 | TAG1 | MV | 30.0 | 35.0 |
| 4 | 2015/8/21 10:00:50 | TAG2 | SV | 91.0 | 89.0 |
| 5 | 2015/8/21 10:01:00 | TAG1 | MV | 35.0 | 40.0 |
| 6 | 2015/8/21 10:02:50 | TAG2 | SV | 89.0 | 90.0 |
| 7 | 2015/8/21 10:03:00 | TAG1 | AUT | MAN | AUT |
| 8 | 2015/8/21 10:03:01 | TAG1 | SV | 2.0 | 3.0 |
| ⋮ | ⋮ | ⋮ | ⋮ | ⋮ | ⋮ |

FIG. 4

| BASIC UNIT MANUAL OPERATION ID | START DATE AND TIME | END DATE AND TIME | TAG NAME | MANUAL OPERATION TYPE | MANUAL OPERATION METHOD | EVENT ID |
|---|---|---|---|---|---|---|
| No. 1 | 2015/8/21 10:00:00 | 2015/8/21 10:00:00 | TAG1 | MAN | MODE CHANGE | No. 1 |
| No. 2 | 2015/8/21 10:00:10 | 2015/8/21 10:01:00 | TAG1 | MV | RAMPING+ | No. 2, No. 3, No. 5 |
| No. 3 | 2015/8/21 10:00:50 | 2015/8/21 10:02:50 | TAG2 | SV | FINE ADJUSTMENT | No. 4, No. 6 |
| No. 4 | 2015/8/21 10:03:00 | 2015/8/21 10:03:00 | TAG1 | AUT | MODE CHANGE | No. 7 |
| No. 5 | 2015/8/21 10:03:01 | 2015/8/21 10:03:01 | TAG1 | SV | SETTING CHANGE+ | No. 8 |
| ... | ... | ... | ... | ... | ... | ... |

FIG. 5

| UNIT MANUAL OPERATION ID | START DATE AND TIME | END DATE AND TIME | TAG NAME | MANUAL OPERATION INTENTION | BASIC UNIT MANUAL OPERATION ID |
|---|---|---|---|---|---|
| No. 1 | 2015/8/21 10:00:00 | 2015/8/21 10:03:01 | TAG1 | FLOW RATE INCREASE | No. 1, No. 2, No. 4, No. 5 |
| No. 2 | 2015/8/21 10:00:50 | 2015/8/21 10:02:50 | TAG2 | TEMPERATURE FINE ADJUSTMENT | No. 3 |
| ... | ... | ... | ... | ... | ... |

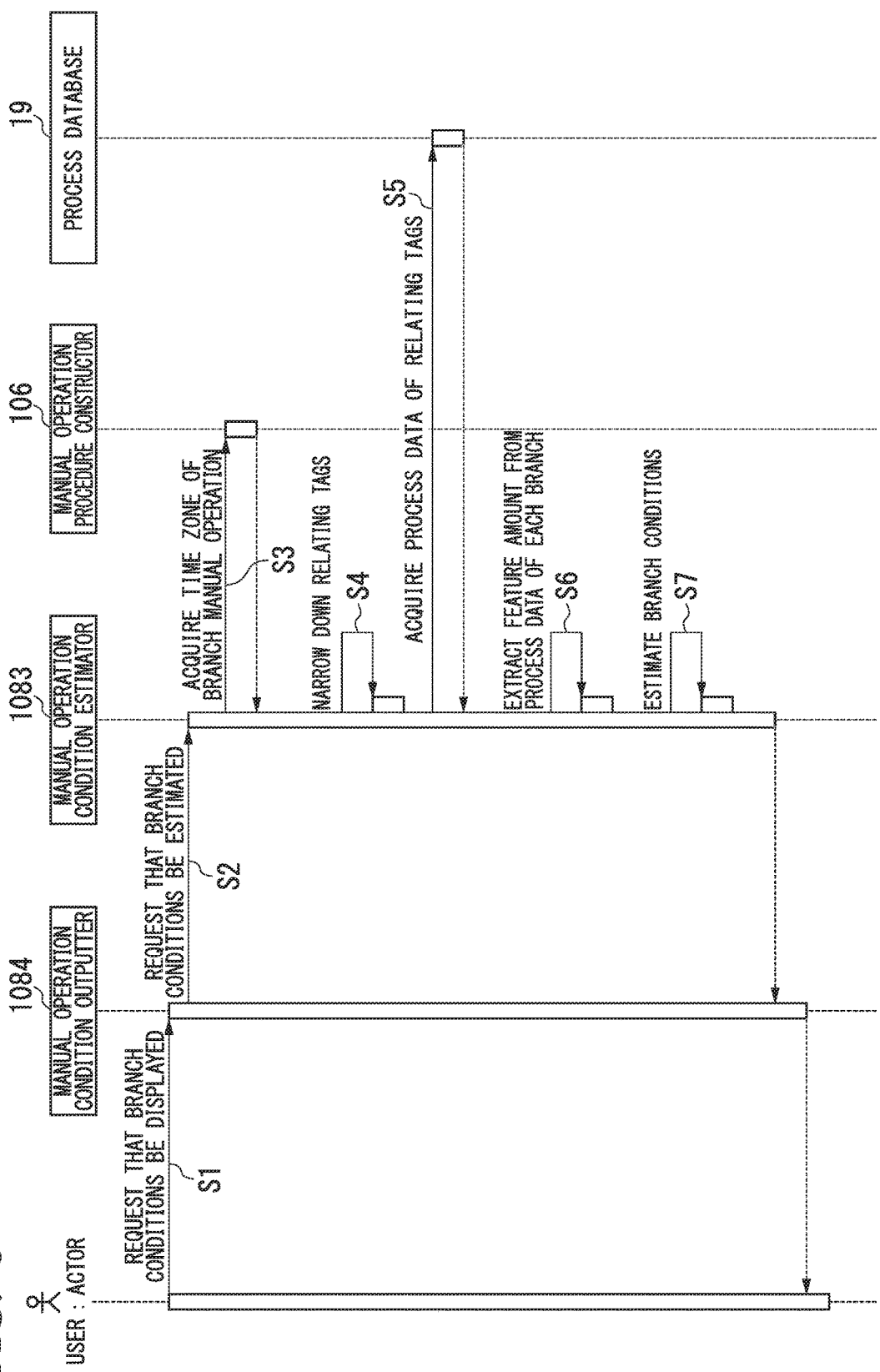

| No | BRANCH | PERIOD OF TIME IMMEDIATELY BEFORE BRANCH MANUAL OPERATION | |
|---|---|---|---|
| | | START TIME | END TIME |
| #1 | Branch1 | 2015/2/3 12:00 | 2015/2/3 12:20 |
| #2 | Branch2 | 2015/3/1 10:00 | 2015/3/1 10:20 |
| #3 | Branch1 | 2015/5/5 11:00 | 2015/5/5 11:20 |
| #4 | Branch1 | 2015/6/6 11:30 | 2015/6/6 11:50 |
| #5 | Branch2 | 2015/7/3 11:00 | 2015/7/3 11:20 |
| #6 | Branch1 | 2015/8/4 12:10 | 2015/8/4 12:30 |
| #7 | Branch2 | 2015/9/9 12:00 | 2015/9/9 12:20 |

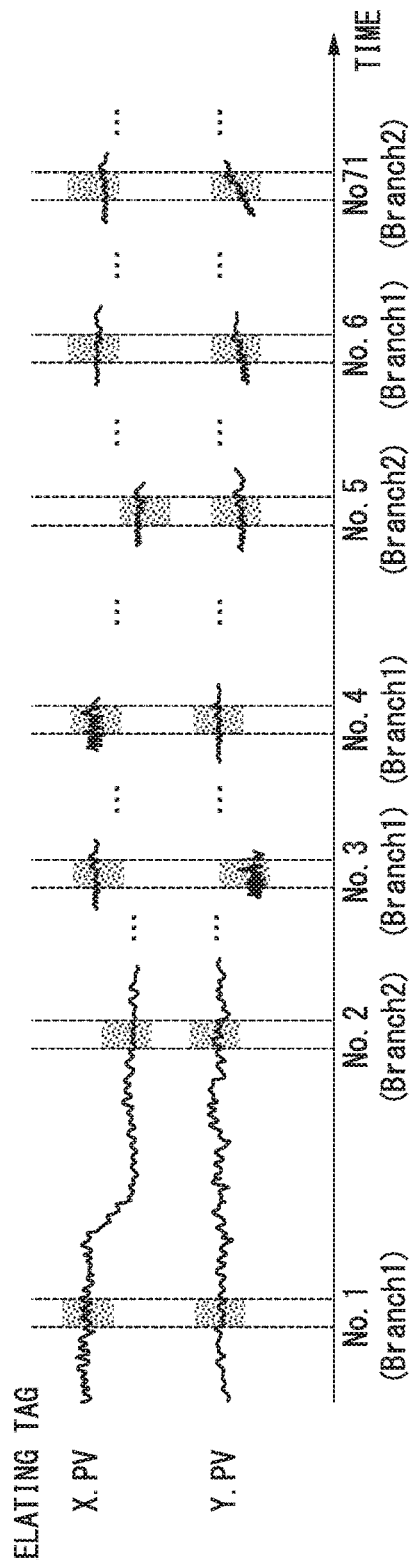

FIG. 10B

| No | BRANCH | X_AVERAGE | X_SLOPE | X_STANDARD DEVIATION | Y_AVERAGE | Y_SLOPE | Y_STANDARD DEVIATION |
|---|---|---|---|---|---|---|---|
| #1 | Branch1 | 50 | 0.33 | 0.356 | 120 | 0.04 | 0.278 |
| #2 | Branch2 | 45 | 0.24 | 0.246 | 122 | 0.04 | 0.298 |
| #3 | Branch1 | 52 | 0.22 | 0.232 | 100 | 0.05 | 0.423 |
| #4 | Branch1 | 51 | 0.25 | 0.435 | 125 | 0.17 | 0.198 |
| #5 | Branch2 | 42 | 0.33 | 0.233 | 110 | 0.1 | 0.233 |
| #6 | Branch1 | 50 | 0.32 | 0.177 | 110 | 0.19 | 0.367 |
| #7 | Branch2 | 50 | 0.25 | 0.165 | 115 | 0.4 | 0.416 |

| No | WAITING/ EXECUTION | WAITING/EXECUTION PERIOD OF TIME ||
|---|---|---|---|
| | | START TIME | END TIME |
| #1 | WAITING | 2015/3/1 11:00 | 2015/3/1 11:05 |
| #2 | EXECUTION | 2015/3/1 11:20 | 2015/3/1 11:25 |
| #3 | WAITING | 2015/7/3 11:55 | 2015/7/3 12:00 |
| #4 | EXECUTION | 2015/7/3 12:10 | 2015/7/3 12:15 |
| #5 | WAITING | 2015/9/9 12:55 | 2015/9/9 13:00 |
| #6 | EXECUTION | 2015/9/9 13:10 | 2015/9/9 13:15 |

| No | CONTINUANCE/ END | MANUAL OPERATION CONTINUANCE/ END PERIOD OF TIME | |
|---|---|---|---|
| | | START TIME | END TIME |
| #1 | CONTINUANCE | 2015/3/1 11:25 | 2015/3/1 11:30 |
| #2 | END | 2015/3/1 11:35 | 2015/3/1 11:40 |
| #3 | CONTINUANCE | 2015/7/3 12:15 | 2015/7/3 12:20 |
| #4 | END | 2015/7/3 12:30 | 2015/7/3 12:35 |
| #5 | CONTINUANCE | 2015/9/9 13:15 | 2015/9/9 13:20 |
| #6 | END | 2015/9/9 13:30 | 2015/9/9 13:45 |

EVENT ANALYZING DEVICE, EVENT ANALYZING SYSTEM, EVENT ANALYZING METHOD, AND NON-TRANSITORY COMPUTER READABLE STORAGE MEDIUM

BACKGROUND

Technical Fields

The present invention relates to an event analyzing device, an event analyzing system, an event analyzing method, and a non-transitory computer readable storage medium.

Priority is claimed on Japanese Patent Application No. 2017-021434, filed Feb. 8, 2017, the contents of which are incorporated herein by reference.

Related Art

In the related art, in plants or factories such as industrial plants such as chemical plants, plants that manage and control well sites such as gas fields and oil wells and their surroundings, plants that manage and control power generation such as hydropower, thermal power or nuclear power, plants that manage and control environmental power generation such as sunlight or wind power, or plants that manage and control water and sewage, dams, or the like (hereinafter sometimes collectively referred to as a "plant"), a control system such as a distributed control system (DCS) is constructed to realize advanced automatic operations. In the distributed control system, field devices (measuring devices and manipulating devices) and a control device for controlling them are connected to each other via a communication means.

A control system such as the DCS can record details of manual operations of operators, manual operation procedures, or the like as an event log. The event log may include not only a manual operation history but also a history of alarm, guidance, or the like. Events collected in real time are sometimes recorded in the event log directly in order of time or are sometimes recorded in the event log after certain data processing is applied to the collected event log. The event log is sometimes recorded in the DCS. The event log is sometimes recorded in a database called a historian which stores the event log as historical data for a long time. The recorded event log is graphed as chronological data and displayed on a display device or printed out through a printing device.

Incidentally, although operations of a plant or the like are often automated, there are also tasks involving an operator's manual operations such as troubleshooting or unsteady operation. Normally, such manual operations are performed according to the descriptions of a standard operation procedure (SOP).

Since the method of operating a plant changes over time, it is necessary to update the descriptions of the SOP according to changes in the manual operation method. It is also desirable to create a new SOP for processes for which there is no SOP such as processes for dealing with problems that were not expected at the time of starting the plant. Some SOPs describe only rough manual operation procedures and do not describe specific manual operation methods. When operators perform manual operation using such an SOP which describes only rough manual operation procedures, the interpretation of the SOP may vary among the operators. This causes variations in manual operations of operators. Therefore, it is desirable to create a new SOP describing specific manual operation methods or to update the SOP's descriptions to standardize (unify) the varying manual operation procedures.

A new SOP is created or a SOP is improved by analyzing an event log accumulated in a DCS or a historian. Analysis of an event log can be performed by an event analyzing device. An event analyzing device can automatically generate an SOP by extracting manual operation records in units of individual event logs from an enormous amount of event logs (see, for example, Japanese Unexamined Patent Application Publication No. 2007-316681, Japanese Unexamined Patent Application Publication No. 2011-237952, and Japanese Unexamined Patent Application Publication No. 2013-020426).

When performing a manual operation for troubleshooting, unsteady operation, or the like, an operator not only performs manual operations in order but also sometimes changes the order or details of manual operations based on a certain intention after determining a process state or the like of the plant. However, for example, determination of the process state or the like is a skill of a skilled operator, and it is sometimes difficult to standardize manual operations regarding the determination.

SUMMARY

An event analyzing device may include an event collector configured to collect log data of a manual operation event performed by an operator of a plant, an event analyzer configured to analyze a manual operation method or a manual operation intention of the manual operation event based on the log data collected by the event collector, a manual operation sequence extractor configured to extract the manual operation method or the manual operation intention analyzed by the event analyzer for each predetermined period as manual operation sequences in order of time, a manual operation sequence classifier configured to classify the manual operation sequences in which manual operations are in a similar order from among the manual operation sequences extracted by the manual operation sequence extractor, a manual operation procedure constructor configured to construct a manual operation procedure of the operator based on the manual operation sequences classified by the manual operation sequence classifier, a process data collector configured to collect process data of the plant, and a manual operation condition estimator configured to estimate an execution condition under which manual operations of the manual operation procedure constructed by the manual operation procedure constructor are performed.

Further features and aspects of the present disclosure will become apparent from the following detailed description of exemplary embodiments with reference to the attached drawings.

BRIEF DESCRIPTION OF THE DRAWINGS

FIG. 4 is a diagram showing exemplary basic unit manual operation data stored in an analysis result database of the event analyzing system according to the embodiment.

FIG. 5 is a diagram showing exemplary unit manual operation data stored in an analysis result database of the event analyzing system according to the embodiment.

FIG. 8 is a sequence diagram showing an exemplary operation of the event analyzing device according to the embodiment.

FIG. 10A and FIG. 10B are diagrams showing an example in which trend feature amounts are extracted from process data in the event analyzing device according to the embodiment.

DETAILED DESCRIPTION OF THE EMBODIMENTS

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide an event analyzing device, an event analyzing system, an event analyzing method, and a non-transitory computer readable storage medium which can automatically extract criteria for performing manual operations and can support standardization of manual operations.

Hereinafter, an event analyzing device, an event analyzing system, an event analyzing method, and a non-transitory computer readable storage medium according to an embodiment of the present invention will be described in detail with reference to the drawings.

Figure 1:
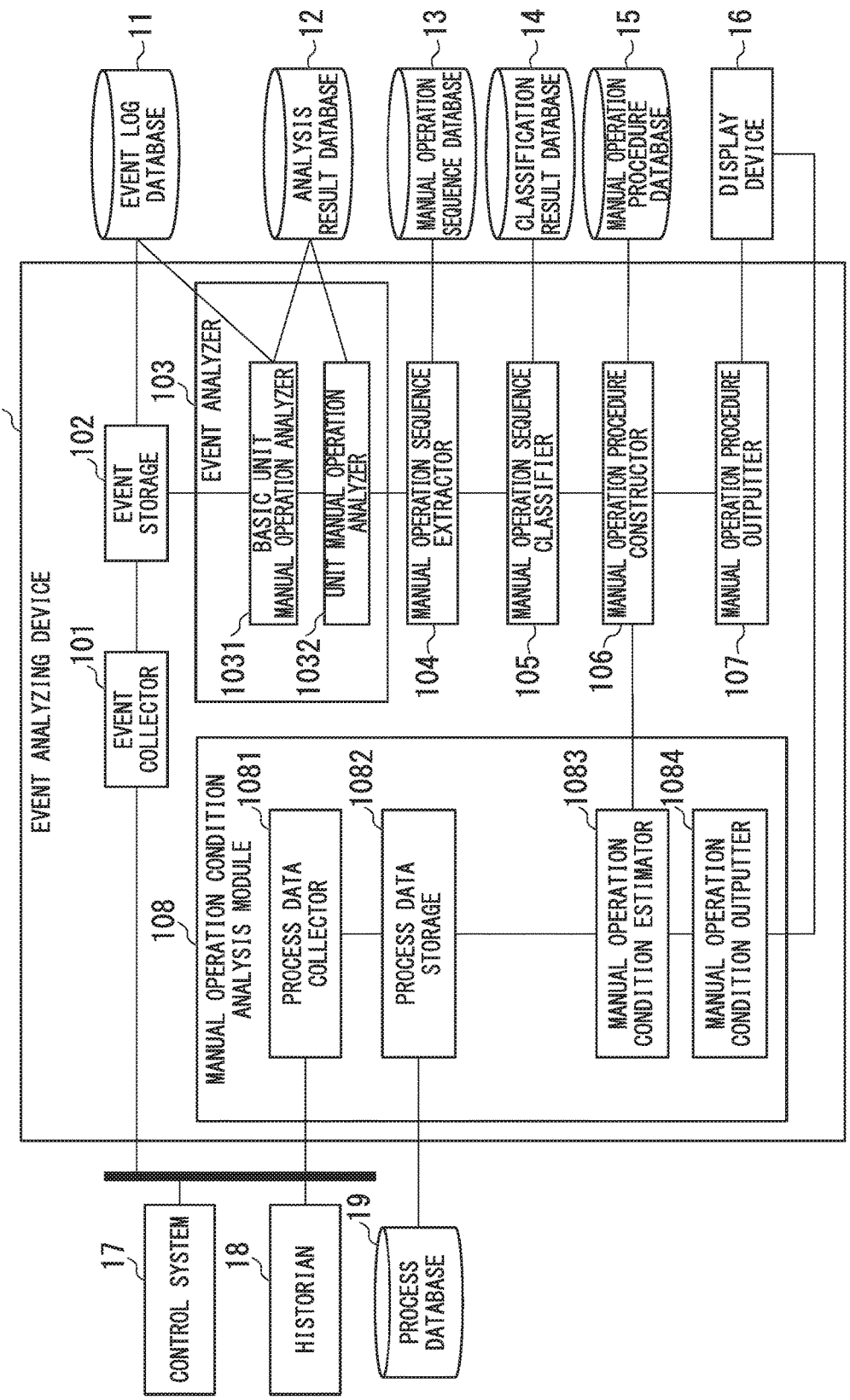
FIG. 1 is a block diagram showing an exemplary functional configuration of an event analyzing system including an event analyzing device according to an embodiment.

First, the functions of the event analyzing device will be described with reference to FIG. 1. FIG. 1 is a block diagram showing an exemplary functional configuration of an event analyzing system including an event analyzing device according to the embodiment. The event analyzing system 1 according to the present embodiment is a system that acquires an event log indicating a history of manual operations of the control system 17 performed by an operator of a plant and extracts a manual operation method or a manual operation intention of the operator.

As shown in FIG. 1, the event analyzing system 1 has respective functions of an event analyzing device 10, an event log database 11, an analysis result database 12, a manual operation sequence database 13, a classification result database 14, a manual operation procedure database 15, a display device 16, a control system 17, a historian 18, and a process database 19. Each of the event log database 11, the analysis result database 12, the manual operation sequence database 13, the classification result database 14, the manual operation procedure database 15, the historian 18, and the process database 19 is, for example, a database device having a mass storage device such as a hard disc drive (HDD). Although FIG. 1 exemplifies a configuration in which the event log database 11, the analysis result database 12, the manual operation sequence database 13, the classification result database 14, the manual operation procedure database 15, the historian 18, and the process database 19 are not included in the event analyzing device 10, these databases may be included in the event analyzing device 10. For example, these databases may be provided by network-connected cloud computing.

The event analyzing device 10 has respective functions of an event collector 101, an event storage 102, an event analyzer 103, a manual operation sequence extractor 104, a manual operation sequence classifier 105, a manual operation procedure constructor 106, a manual operation procedure outputter 107, and a manual operation condition analysis module 108. The event analyzer 103 has respective functions of a basic unit manual operation analyzer 1031 and a unit manual operation analyzer 1032. The manual operation condition analysis module 108 has respective functions of a process data collector 1081, a process data storage 1082, a manual operation condition estimator 1083, and a manual operation condition outputter 1084. These functions (event analysis functions) of the event analyzing device 10 can be realized by software (a program). That is, the event analyzing device 10 can be realized, for example, by executing an event analysis program having an event analysis function on a general-purpose computer such as a desktop type PC, a server device, or the like.

The control system 17 is a system such as a DCS that controls a plant (not shown). For example, it is assumed that the control system 17 can detect the operator's manual operation of a manual operation device such as a switch, a volume adjuster (a variable resistor), or the like of a manual operation panel or a manual operation console (not shown) as a manual operation event. The manual operation event detected by the control system 17 is stored as event log data in a storage (not shown) of the control system 17.

The historian 18 is a device that records event log data stored in the control system 17 in order of time. The process database 19 is a database in which process data of sensors or the like of the plant is recorded by the process data storage 1082. The historian 18 may be one that stores event log data for a long period of time. The historian 18 or the process database 19 may be implemented as a part of the DCS function. For example, the control system 17, the historian 18, and the process database 19 are communicably connected to the event analyzing device 10 via a communication line such as a wired or wireless network. Although FIG. 1 shows the case in which the event analyzing system 1 includes one event analyzing device 10, one control system 17, one historian 18, and one process database 19, the device configuration of the event analyzing system 1 is not limited thereto. For example, the event analyzing system 1 may be one in which one event analyzing device 10 is connected to a plurality of control systems 17.

The event collector 101 collects event log data including a history of manual operations of the control system 17 performed by the operator from at least one of the control system 17 or the historian 18 (hereinafter referred to as a "historian 18 or the like") in which event log data is recorded. The collection of event log data may be performed, for example, by regularly or irregularly transmitting, by the event collector 101, an acquisition request to the historian 18 or the like and transmitting, by the historian 18 or the like, event log data in response to the acquisition request (pull type acquisition). The collection of event log data may also be performed by regularly or irregularly transmitting, by the historian 18 or the like, event log data to the event collector 101 (push type acquisition). The event collector 101 provides the collected event log data to the event storage 102.

The event storage 102 stores the event log data acquired from the event collector 101 in the event log database 11. The event log data includes, for example, information regarding manual operations of the operator such as an event occurrence time, a device identifier (tag), a manual operation type identifier, set values before being changed, and set values after being changed. Details of the event log data will be described later with reference to FIG. 3.

The event log database 11 is a database which stores event log data. The event log database 11 stores the event log data acquired from the event storage 102 and allows the event log data to be read by the basic unit manual operation analyzer 1031 of the event analyzer 103.

The event analyzer 103 acquires and analyzes the event log data stored in the event log database 11. The acquisition of the event log data is performed, for example, by the user of the event analyzing device 10 designating an event occurrence period of time. Designation of the period is performed, for example, by designating a period in which a manual operation to be analyzed is included, and a plurality of periods may be designated.

The event analyzer 103 performs the analysis of the event log data through two functional units thereof, i.e., the basic unit manual operation analyzer 1031 and the unit manual operation analyzer 1032. The basic unit manual operation analyzer 1031 analyzes the event log data and extracts a "basic unit manual operation" indicating the manual operation method of the operator included in the event log data. On the other hand, the unit manual operation analyzer 1032 extracts a "unit manual operation" indicating the manual operation intention of the operator included in the basic unit manual operation based on the basic unit manual operation extracted by the basic unit manual operation analyzer 1031.

In general, an operator of a plant performs a manual operation of increasing or decreasing a set variable (SV) (i.e., a target value) or a manipulated variable (MV) (i.e., an amount of manual operation) when he or she has a manual operation intention to increase or decrease a process value such as flow rate or pressure. The operator performs a manual operation such as fine adjustment of the process value when he or she has a manual operation intention to keep the process value such as flow rate or pressure constant. That is, the operator's manual operation intention is to increase or decrease a target process value or to stabilize the target process value. The event analyzer 103 analyzes the acquired event log and extracts such manual operation intentions of the operator.

For example, when the operator has a manual operation intention to increase the process value, the operator may perform a manual operation method of changing the setting of the SV or MV through ramping, which is a manual operation of gradually changing the SV or MV, and may also perform a manual operation method of changing the setting of the SV or MV through one manual operation. As described above, there are a plurality of types of manual operation methods even when manual operation is performed based on the same manual operation intention. In addition, when a manual operation method such as ramping is performed, the SV or MV manual operation method may sometimes be identified by analyzing it into further detailed manual operations.

In the following description, a plurality of manual operations of the operator grouped as a basic unit are referred to as a "basic unit manual operation." In addition, a plurality of basic unit manual operations combined to indicate a manual operation intention of the operator are referred to as a "unit manual operation." Unit manual operations are exemplified by four types "increase," "decrease," "fine adjustment" or "increase/decrease." Here, "increase/decrease" is a unit manual operation with a manual operation intention in which increase and decrease are repeated in a short period of time. It is to be noted that the manual operation units are not limited to the above four types, but may be appropriately changed depending on an object to be manipulated.

Basic unit manual operations are exemplified by six types "ramping (increase)," "ramping (decrease)," "fine adjustment," "setting change (increase)," "setting change (decrease)," and "mode change." "Ramping (increase)" is a manual operation method of gradually increasing an SV value, an MV value, or the like, and may be referred to as "ramping+." "Ramping (decrease)" is a manual operation method of gradually decreasing an SV value, an MV value, or the like, and may be referred to as "ramping−." "Fine adjustment" is a manual operation method of finely adjusting an SV value, an MV value, or the like. "Setting change" is a manual operation of greatly changing an SV value or an MV value by one manual operation. A setting change manual operation for increasing an SV value, an MV value, or the like may sometimes be referred to as "setting change+." A setting change manual operation for decreasing an SV value, an MV value, or the like may sometimes be referred to as "setting change−." For example, when there are two types of manual operation modes "automatic" and "manual", "mode change" is a manual operation method of changing the manual operation mode from automatic to manual or from manual to automatic. It is to be noted that the basic unit manual operations are not limited to the above six types, but may be appropriately changed depending on an object to be manipulated.

A unit manual operation is a manual operation that has a higher abstraction level than a basic unit manual operation. Therefore, in a process of analyzing an event log, two-stage extraction processes are performed. First, the basic unit manual operation analyzer 1031 extracts basic unit manual operations from the event log. Then, the unit manual operation analyzer 1032 extracts a unit manual operation from the basic unit manual operations extracted by the basic unit manual operation analyzer 1031.

The basic unit manual operation analyzer 1031 analyzes event log data to determine the manual operation method (ramping, fine adjustment, or the like) of the operator and to extract basic unit manual operations. For example, the basic unit manual operation analyzer 1031 extracts a group of event logs of the same device type and the same manual operation type from a plurality of pieces of event log data and extracts basic unit manual operations based on both the tendency of change in set values by manual operations of the operator and the temporal continuity. As described above, the basic unit manual operations to be extracted are 6 types, "ramping (increase)," "ramping (decrease)," "fine adjustment," "setting change (increase)," "setting change (decrease)," and "mode change." The basic unit manual operation analyzer 1031 stores data indicating the extracted basic unit manual operations (hereinafter referred to as "basic unit manual operation data") in the analysis result database 12.

The unit manual operation analyzer 1032 estimates a "unit manual operation" indicating the manual operation intention of the operator based on the basic unit manual operation data obtained through the analysis of the basic unit manual operation analyzer 1031. For example, the unit manual operation analyzer 1032 estimates the manual operation intention from the basic unit manual operation data based on a rule base in which basic unit manual operations and manual operation intentions of the operator are associated with each other. The rule base is one that predetermines which type of basic unit manual operation (or combination of basic unit manual operations) the operator is to perform for which manual operation intention of the operator. For example, the rule base may be created using a skilled operator's manual operation history in a plant as a sample or may be created based on domain knowledge of the operator in the plant (i.e., manual operation knowledge in a plant in which manual operation is to be performed). The unit manual operation analyzer 1032 stores data indicating the estimated unit manual operation (hereinafter referred to as "unit manual operation data") in the analysis result database 12.

For example, two-stage processes, i.e., the analysis process of the basic unit manual operation analyzer 1031 and the analysis process of the unit manual operation analyzer 1032, are sequentially performed in synchronization with each other. In the case in which the two-stage processes are performed synchronously, for example, when the basic unit manual operation analyzer 1031 has stored basic unit manual operation data as its analysis result in the analysis result database 12, the basic unit manual operation analyzer 1031 transmits a command instructing that processing be started to the unit manual operation analyzer 1032. Upon receiving the command, the unit manual operation analyzer 1032 reads the basic unit manual operation data stored in the analysis result database 12 and performs an analysis process. However, the above two-stage processes may be performed asynchronously. Storing the basic unit manual operation data in the analysis result database 12 allows the two-stage processes to be performed either synchronously or asynchronously.

The manual operation sequence extractor 104 extracts a manual operation sequence based on the basic unit manual operation data or the unit manual operation data which is an analysis result of the event analyzer 103. The manual operation sequence is a set of basic unit manual operations or unit manual operations linked in order of time. The manual operation sequence extractor 104 generates a manual operation sequence in which pieces of the basic unit manual operation data or the unit manual operation data are linked in order of time based on date and time information included in the basic unit manual operation data or the unit manual operation data. The manual operation sequence including basic unit manual operations includes information indicating a "manual operation method" that indicates which parameter value the operator has changed using which method for each device. The manual operation sequence including unit manual operations includes information indicating a "manual operation intention" that indicates the intention with which the operator performs the manual operations for each device.

The manual operation sequence classifier 105 calculates the degrees of similarity of manual operation sequences extracted by the manual operation sequence extractor 104 and classifies the manual operation sequences based on the calculated degrees of similarity. That is, the manual operation sequence classifier 105 classifies manual operation sequences whose manual operation intentions are similar and in which manual operations included in each manual operation sequence of the manual operation method are in a similar order as one type. The manual operation sequence classifier 105 stores a classification result obtained through the classification process in the classification result database 14.

The manual operation procedure constructor 106 analyzes the manual operation sequences classified as the same type and constructs a manual operation procedure. The construction of the manual operation procedure is a process of analyzing the connection of manual operations. For example, the connection of manual operations includes a series connection in which the manual operations are connected in series, a parallel connection in which the manual operations are connected in parallel, a branch connection in which one manual operation is branched into a plurality of manual operations, or the like. The series connection is a form of connection in which one manual operation and another manual operation are sequentially performed. The parallel connection is a form of connection in which a plurality of manual operations are performed in parallel and the next manual operation is performed upon completion of the plurality of manual operations performed in parallel. The branch connection is a form of connection in which a single manual operation is selected and performed from a plurality of manual operations under a predetermined condition upon completion of a manual operation. By analyzing the connection of manual operations described above, the manual operation procedure constructor 106 constructs a structure of the manual operation procedure as structure information from the manual operation sequences classified as the same type by the manual operation sequence classifier 105. The structure information can be expressed, for example, as a directional acyclic graph.

Further, by analyzing the connection of manual operations, the manual operation procedure constructor 106 can calculate a branch connection of manual operations and the branch probability thereof. For example, when process A is branched to either process B or C, the branch probability means the probability of branching of the process A to the process B or C. The manual operation procedure constructor 106 stores the constructed manual operation procedure in the manual operation procedure database 15. The manual operation procedure constructor 106 also outputs the constructed manual operation procedure to the manual operation procedure outputter 107. The manual operation procedure constructed by the manual operation procedure constructor 106 may include information such as a distribution of set parameter values regarding each manual operation, a distribution of execution durations during which manual operations continue to be performed (or executed), a distribution of time intervals between manual operations, or the like.

The manual operation procedure outputter 107 displays the directional acyclic graph of the manual operation procedure generated by the manual operation procedure constructor 106 on the display device 16. Nodes in the displayed directional acyclic graph represent unit manual operations constituting a procedure. An arrow between nodes represents a series order relationship between manual operations and two parallel transverse lines represent a parallel relationship between manual operations. Furthermore, the probability of transition from the connection source node to the connection destination node can also be displayed next to each arrow.

The manual operation condition analysis module 108 has respective functions of a process data collector 1081, a process data storage 1082, a manual operation condition estimator 1083, and a manual operation condition outputter 1084.

The process data collector 1081 collects process data from the control system 17 or the historian 18. The process data is, for example, physical quantity data such as pressure, temperature, pH, or product flow rate in processes of the plant. The process data may include a numerical value calculated from the physical quantity. The process data collector 1081 collects process data irregularly or regularly at predetermined time intervals. The process data collector 1081 outputs the acquired process data to the process data storage 1082.

The process data storage 1082 stores the process data collected by the process data collector 1081 in the process database 19. The process data storage 1082 outputs the process data to the manual operation condition estimator 1083. The process data storage 1082 may acquire the process data to be output to the manual operation condition estimator 1083 from the process data collector 1081 and sequentially output the process data directly to the manual operation condition estimator 1083 or may read the process data from the process database 19 once the process data is stored in the process database 19 and output the read process data to the manual operation condition estimator 1083. The process data storage 1082 may read the process data stored in the process database 19 in response to a process data acquisition request from the manual operation condition estimator 1083.

For each manual operation procedure constructed by the manual operation procedure constructor 106, the manual operation condition estimator 1083 estimates a condition under which the manual operation procedure is performed. The manual operation condition estimator 1083 acquires from past event log data the time when a manual operation was performed from a branch of the manual operation procedure constructed by the manual operation procedure constructor 106. When the manual operation procedure includes a plurality of branches, the manual operation condition estimator 1083 acquires the manual operation time at each branch. The manual operation procedure constructed by the manual operation procedure constructor 106 is extracted from a plurality of similar manual operation sequences included in the past event log data. The manual operation condition estimator 1083 can extract both which manual operation was performed and the time (the start time, the end time, or the like) when the manual operation was performed as a branch destination at the branch of the manual operation sequence. Further, the manual operation condition estimator 1083 estimates as a branch condition a feature amount of a piece of process data with which it is assumed that the operator has determined to perform a branch destination manual operation among pieces of process data immediately before branches where branch destination manual operations are performed. The period of time immediately before branching may be, for example, a fixed time such as 20 minutes. The period of time immediately before branching may also be individually set according to the branch source manual operation or the branch destination manual operation. Estimation of the branch condition will be described later with reference to FIG. 9A and FIG. 9B.

Each manual operation (basic unit manual operation or unit manual operation) included in the manual operation procedure constructed by the manual operation procedure constructor 106 may sometimes include an execution condition determined by the operator. Execution of a manual operation is, for example, start of a manual operation, end of a manual operation, or branch of a manual operation. The execution condition of a manual operation is, for example, a manual operation start condition for starting a manual operation, a manual operation end condition for ending a manual operation, or a branch condition for determining which manual operation is to be started when a manual operation branches. For example, the operator may check whether a PV value satisfies a predetermined condition (a start condition) when starting the next manual operation connected in series in the manual operation procedure. The operator may also end a manual operation after confirming that the PV value satisfies a predetermined condition (an end condition). Further, the operator may start one manual operation when the PV value satisfies a predetermined condition (a branch condition) and may start another manual operation when the PV value does not satisfy the predetermined condition. These execution conditions may not be included in the event log data since the operator checks the execution conditions by visual inspection or the like to perform a task. The manual operation procedure constructor 106 associates process data collected by the process data collector 1081 with a manual operation procedure constructed by the manual operation procedure constructor 106. Thus, the manual operation procedure constructor 106 estimates which process data a manual operation process was performed for by analyzing a PV value or the like when the manual operation procedure was performed by the operator (when the manual operation procedure was started, ended, or branched by the operator). That is, the manual operation procedure constructor 106 estimates the following manual operation procedure execution conditions (a) to (c).

(a) Branch condition when a manual operation is split into a plurality of branches (b) Start condition of each manual operation (c) End condition of each manual operation The manual operation condition estimator 1083 acquires the manual operation procedure data constructed by the manual operation procedure constructor 106, analyzes the feature amount of the process data when each of the acquired manual operations was performed, and estimates the execution conditions (a) to (c). The manual operation condition estimator 1083 outputs the estimated execution conditions to the manual operation condition outputter 1084. Details of the analysis of the feature amount of the process data will be described later with reference to FIG. 10A, FIG. 10B, and so on.

The manual operation condition outputter 1084 superimposes the execution conditions acquired from the manual operation condition estimator 1083 on the directional acyclic graph of the manual operation procedure output from the manual operation procedure outputter 107 and displays the resulting graph on the display device 16.

In the description of FIG. 1, the respective functions of the event collector 101, the event storage 102, the event analyzer 103, the manual operation sequence extractor 104, the manual operation sequence classifier 105, the manual operation procedure constructor 106, the manual operation procedure outputter 107, and the manual operation condition analysis module 108 (including the respective functions of the process data collector 1081, the process data storage 1082, the manual operation condition estimator 1083, and the manual operation condition outputter 1084) of the event analyzing device 10 are realized by software. However, one or more of the functions described above may be realized by hardware. Each of the above functions may be realized by dividing the function into a plurality of functions. Each of the above functions may also be realized by incorporating two or more functions thereof into one function. Each of the above functions of the event analyzing device 10 may also be realized by a computer system including two or more computer devices.

Figures 2, 3:
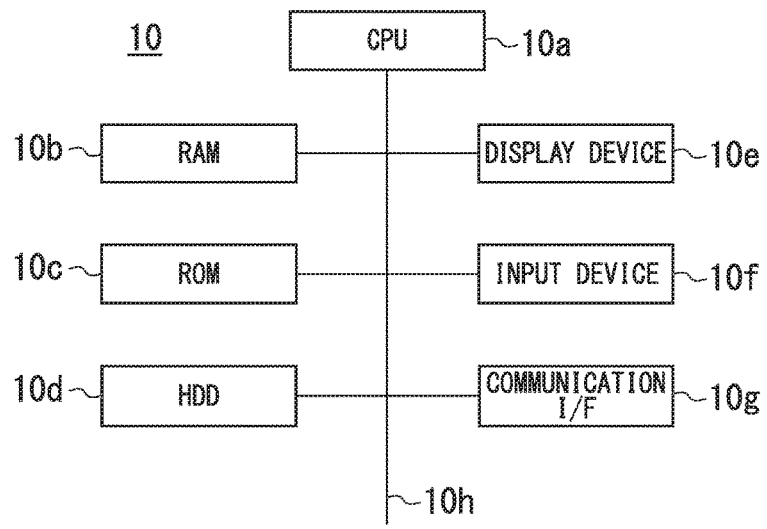
FIG. 2 is a block diagram showing an exemplary hardware configuration of the event analyzing device according to the embodiment.
FIG. 3 is a diagram showing exemplary event log data stored in an event log database of the event analyzing system according to the embodiment.

Next, a hardware configuration of the event analyzing device 10 will be described with reference to FIG. 2. FIG. 2 is a block diagram showing an exemplary hardware configuration of the event analyzing device 10 according to the embodiment.

As shown in FIG. 2, the event analyzing device 10 includes a central processing unit (CPU) 10a, a random access memory (RAM) 10b, a read only memory (ROM) 10c, a hard disk drive (HDD) 10d, a display device 10e, an input device 10f, a communication interface (I/F) 10g, and a bus 10h connecting these components.

The event analyzing device 10 is, for example, a server device, a general-purpose computer such as a desktop type PC, an FA computer, a device such as a PLC, a notebook or tablet type computer, a PDA, a smart phone, or the like. The hardware of the event analyzing device 10 may be configured as a single device or may be a system including a combination of a plurality of devices. The event analyzing device 10 may also share hardware with other devices.

The CPU 10a controls the event analyzing device 10 by executing programs stored in the RAM 10b, the ROM 10c, or the HDD 10d. The CPU 10a executes an event analysis program for realizing the operation of the event analyzing device 10. For example, the event analysis program is acquired from a recording medium on which the event analysis program is recorded, a server that provides an information processing program via a network, or the like and is installed in the HDD 10d, and is stored in the RAM 10b such that it is readable by the CPU 10a.

The display device 10e is, for example, a liquid crystal display having a display function. The display device 10e may be realized in various forms such as a head mount type display, an eyeglass type display, a wristwatch type display, or the like. The input device 10f is, for example, a keyboard or a mouse having an input function. The input device 10f may be a microphone for inputting sound information, a camera or scanner for inputting image information, or the like. In the present embodiment, the display device 10e and the input device 10f may be realized by a device having display and input functions such as a touch panel.

The communication I/F 10g controls communication with other devices such as the control system 17, the historian 18, the event log database 11, or the like described with reference to FIG. 1 through wired communication or wireless communication. The communication I/F 10g controls communication with the other connected devices such as data transmission/reception, voice communication, or mail transmission/reception. The communication I/F 10g controls communication corresponding to general-purpose communication standards such as, for example, wireless LAN communication, wired LAN communication, infrared communication, or short-range wireless communication.

The communication I/F 10g may be one that controls communication with a device such as a field device of a plant (not shown) through wired communication or wireless communication. The communication I/F 10g may also be one that performs communication control corresponding to communication standards dedicated to industrial instruments such as, for example, ISA 100 which is a wireless communication standard of the international society of automation (ISA: international society for measurement and control), highway addressable remote transducer (HART) (registered trademark), BRAIN (registered trademark), FOUNDATION Fieldbus, or PROFIBUS.

In the description of FIG. 2, the display device 10e is separated from the display device 16, but the display device 10e and the display device 16 may be the same device.

Next, details of the event log data will be described with reference to FIG. 3. FIG. 3 is a diagram showing exemplary event log data stored in the event log database of the event analyzing system according to the embodiment.

As shown in FIG. 3, the event log data includes six data items of "event ID," "date and time," "tag name," "manual operation type," "previous value," and "current value." Each row in the shown table corresponds to a piece of event log data. Thus, FIG. 3 shows a history of collection of event log data in order of time.

The data item of "event ID (identifier)" is an identifier uniquely identifying each event log.

The data item of "date and time" indicates the occurrence date and time when each event occurred (that is, the date and time when the event log was generated) in the control system 17 of FIG. 1. The event occurrence date and time is, for example, the date and time when the operator started the manual operation, the date and time when the operator ended the manual operation, or the date and time when the event log was recorded. Since the data item of "date and time" is analyzed in association with a process data change by the manual operation condition estimator of FIG. 1, it is desirable to record the date and time suitable for analysis. The event log data shown is recorded in order of the occurrence date and time of the event.

The data item of "tag name" is an identifier (tag) identifying a field device to be manipulated. For example, one valve name is assigned to one valve. FIG. 3 exemplifies "TAG 1" and "TAG 2" as tag names.

The data item of "manual operation type" indicates the type of a manual operation that the operator has performed on the field device identified by "tag name." FIG. 3 exemplifies four types of manual operations, "MAN," "AUT," "MV" and "SV." Here, "MAN" is a manual operation of changing the manual operation mode from automatic to manual, "AUT" is a manual operation of changing the manual operation mode from manual to automatic, and "MV" is a manual operation of changing the amount of manual operation. "SV" is a manual operation of changing the target value.

The data item of "previous value" is a set value (a previous value) before the manual operation is performed by the operator. The data item of "current value" is a set value (a current value) after the manual operation is performed by the operator. "MAN" and "AUT" are the manual operation mode set before or after the manual operation. For example, when the "previous value" is "AUT" and the "current value" is "MAN," this indicates that the manual operation mode has been changed from automatic to manual by the operator. On the other hand, when the "previous value" and the "current value" are numerical values, this indicates that the value of "MV" or "SV" of the manual operation type has been changed from the previous value to the current value by the manual operation. For example, the event log data of event ID="2" indicates that the operator has changed the set value of a "manipulated variable (MV)" for a field device of "TAG 1" from "25.0 (%)" to "30.0 (%)" at "10:00:10 on Aug. 21, 2015."

FIG. 3 has been described with regard to the case in which the data format of the event log data is a table format, but the data format of the event log data is not limited thereto. The data format of the event log data may be, for example, a comma-separated values (CSV) data format, an extensible markup language (XML) data format, or the like.

Next, basic unit manual operation data will be described with reference to FIG. 4. FIG. 4 is a diagram showing exemplary basic unit manual operation data stored in the analysis result database 12 of the event analyzing system 1 according to the embodiment. The basic unit manual operation data is an analysis result obtained through the analysis of the basic unit manual operation analyzer 1031 based on the event log data as described with reference to FIG. 1.

As shown in FIG. 4, the basic unit manual operation includes seven data items, "basic unit manual operation ID," "start date and time," "end date and time," "tag name," "manual operation type," "manual operation method," and "event ID."

A value indicating an identifier uniquely identifying each basic unit manual operation is stored in the data item of "basic unit manual operation ID."

The data item of "start date and time" indicates the start date and time of each basic unit manual operation, that is, the date and time when a piece of event log data was first generated among pieces of event log data included in the basic unit manual operation. The data item of "end date and time" indicates the end date and time of each basic unit manual operation, that is, the date and time when a piece of event log data was last generated among pieces of event log data included in the basic unit manual operation. When the number of pieces of event log data included in the basic unit manual operation is one, the "start date and time" and the "end date and time" have the same value. The start date and time and the end date and time are determined by the collection period of the event log data to be analyzed. An arbitrary period can be set as the collection period of the event log data. For example, when the collection period of the event log data is lengthened, the number of samples of the event log data to be analyzed included in the basic unit manual operation can be increased. On the other hand, when the collection period of the event log data is shortened, the event log data to be analyzed included in the basic unit manual operation is less susceptible to changes over time such as degradation of the field device.

The data item of "tag name" is the same as that of the event log data and indicates an identifier identifying the field device to be manipulated. The data item of "manual operation type" is also the same as that of the event log data and indicates the type of manual operation that the operator has performed on the field device identified by "tag name."

The data item of "manual operation method" indicates the manual operation method of the manual operation performed by the operator. The manual operation methods of the basic unit manual operation are six types, "ramping+," "ramping−," "fine adjustment," "setting change+," "setting change−" and "mode change" as described above.

The data item of "event ID" indicates the event ID of each piece of event log data included in the basic unit manual operation. For example, a basic unit manual operation whose "basic unit manual operation ID" is "No. 2" indicates that a manual operation whose "manual operation type" is "MV" is performed on a field device whose "tag name" is "TAG 1" using a manual operation method of "ramping+" and includes pieces of event log data whose "event IDs" are "No. 2," "No. 3," and "No. 5" as shown in FIG. 3.

FIG. 4 shows that the basic unit manual operation analyzer 1031 has extracted five basic unit manual operations whose "basic unit manual operation IDs" are "No. 1" to "No. 5" based on the event log data shown in FIG. 3.

FIG. 4 has been described with regard to the case in which the data format of the basic unit manual operation data is a table format, but the data format of the basic unit manual operation data is not limited thereto. The data unit of the basic unit manual operation data may be, for example, a comma-separated values (CSV) data format, an extensible markup language (XML) data format, or the like.

Next, unit manual operations will be described with reference to FIG. 5. FIG. 5 is a diagram showing exemplary unit manual operation data stored in the analysis result database of the event analyzing system 1 according to the embodiment. Unit manual operation data is an analysis result obtained through the analysis of the unit manual operation analyzer 1032 of FIG. 1 based on the basic unit manual operation data of FIG. 4.

As shown in FIG. 5, the unit manual operation data has data items of "unit manual operation ID," "start date and time," "end date and time," "tag name," "manual operation intention," and "basic unit manual operation ID."

The data item of "unit manual operation ID" is an identifier uniquely identifying each unit manual operation. FIG. 5 shows that two unit manual operations "No. 1" and "No. 2" have been analyzed.

The data item of "start date and time" indicates the start date and time of each unit manual operation, that is, the start date and time of a basic unit manual operation was first performed among basic unit manual operations included in the unit manual operation. The data item of "end date and time" is the end date and time of each unit manual operation, that is, the end date and time of a basic unit manual operation which was last performed among the basic unit manual operations included in the unit manual operation.

The data item of "tag name" is the same as that of the event log data or the basic unit manual operation data and indicates an identifier identifying the field device to be manipulated.

The item "manual operation intention" is a manual operation intention of a manual operation(s) performed by the operator. The manual operation intention is estimated by the unit manual operation analyzer 1032 in FIG. 1 based on the basic unit manual operation data. When performing a manual operation(s) with a predetermined manual operation intention, the operator performs a predetermined basic unit manual operation or a predetermined combination of basic unit manual operations. The unit manual operation analyzer 1032 estimates the manual operation intention of the operator from the execution state of the basic unit manual operation(s) based on the rule base in which the basic unit manual operation(s) and the manual operation intention have been associated with each other beforehand. As shown in FIG. 5, for example, when a piece of unit manual operation data whose "unit manual operation ID" is "No. 1" indicates that basic unit manual operations whose "basic unit manual operation IDs" are "No. 1," "No. 2," "No. 4," and "No. 5" are performed for a field device whose "tag ID" is "TAG 1" within a predetermined time indicated by the "start date and time" and the "end date and time" based on the rule base, the unit manual operation analyzer 1032 estimates that the corresponding "manual operation intention" of the operator is an "increase in flow rate." Similarly, when a piece of unit manual operation data whose "unit manual operation ID" is "No. 2" indicates that a basic unit manual operation whose "basic unit manual operation ID" is "No. 3" is performed for a field device whose "tag ID" is "TAG 2" based on the rule base, the unit manual operation analyzer 1032 estimates that the corresponding "manual operation intention" of the operator is "fine adjustment of temperature."

FIG. 5 has been described with regard to the case in which the data format of the unit manual operation data is a table format, but the data format of the unit manual operation data is not limited thereto. The data format of the unit manual operation data may be, for example, a comma-separated values (CSV) data format, an extensible markup language (XML) data format, or the like.

Figure 6:
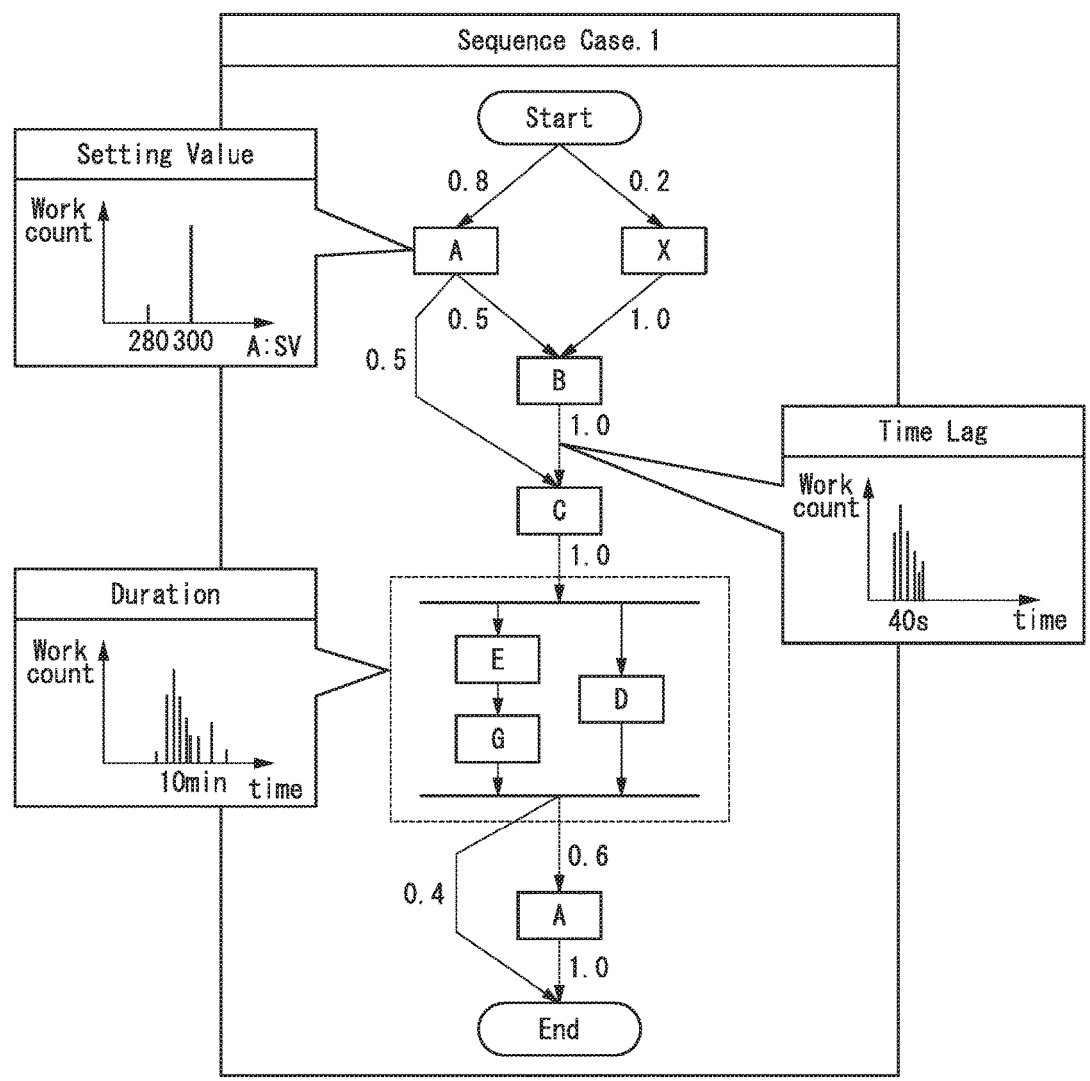
FIG. 6 is a diagram showing an exemplary manual operation procedure of an operator constructed by the event analyzing device according to the embodiment.

Next, the manual operation procedure of the operator will be described with reference to FIG. 6. FIG. 6 is a diagram showing an exemplary manual operation procedure of the operator constructed by the event analyzing device 10 according to the embodiment. The manual operation sequence extractor 104 in FIG. 1 extracts manual operation sequences from the unit manual operation data described with reference to FIG. 5. The manual operation sequence classifier 105 calculates the degrees of similarity of the extracted manual operation sequences to classify the extracted manual operation sequences. The manual operation procedure constructor 106 constructs a manual operation procedure represented by a directional acyclic graph shown in FIG. 6 based on the classified manual operation sequences. That is, manual operation sequences shown in FIG. 6 are constructed based on both the order of basic unit manual operations classified according to the degrees of similarity and the connection of the basic unit manual operations.

In FIG. 6, rectangles such as "A," "B," or "X" are "nodes (joints)," each representing a basic unit manual operation. Arrows connecting the nodes indicate the manual operation procedure of the basic unit manual operations. For example, an arrow connecting the node X to the node B represents a serial connection in which the manual operation of the node B starts after the manual operation of the node X ends. A number written next to the arrow is the rate (probability) at which the next manual operation is performed. For example, the rate at which the manual operation of the node B is performed subsequent to the manual operation of the node X is 1.0, which is a probability of 100%. Here, the connection with a rate of 1.0 indicates that the manual operation of the node B was performed subsequent to the manual operation of the node X at a rate of 1.0 in a plurality of manual operation sequences having a high degree of similarity to the manual operation sequences of FIG. 6.

Also, arrows branching from the start to the two nodes A and B indicate branching connections. This indicates that the manual operation of the node A was performed from the start at a rate of 0.8 and the manual operation of the node B is performed from the start at a rate of 0.2 in the plurality of manual operation sequences having a high degree of similarity.

Also, arrows connecting the node C to the nodes E and D indicate parallel connections. This indicates that a parallel connection enclosed by a broken line was performed at a rate of 1.0 in the plurality of manual operation sequences having a high degree of similarity. In the parallel connection, manual operations interposed between horizontal lines are performed in parallel. That is, upon completion of both the manual operations of the node E and the node G and the manual operation of the node D, the procedure ends (the manual operations end) at a rate of 0.4 and the manual operation of the node A is performed at a rate of 0.6.

The shown "Setting Value" indicates a distribution of set values with manual operations at the node A and represents the number of times the SV is set to 280 and the number of times the SV is set to 300 with manual operations at the node A. "Time Lag" indicates a distribution of delay times until manual operations of the node C start from the end of manual operations of the node B and the number of the delays. "Duration" indicates a distribution of the duration and the number of occurrences of manual operations in the parallel connection enclosed by the broken line.

The manual operation procedure outputter 107 of FIG. 1 can generate display data of the directional acyclic graph shown in FIG. 6 and the graphs of "Setting Value," "Time Lag" or "Duration" and display the generated display data on the display device 16. This makes it possible to generate an SOP for the operator's manual operations. In the present embodiment, it is assumed that images of conditions described with reference to FIG. 7 are displayed superimposed on the directional acyclic graph of FIG. 6.

The manual operation procedure of the operator of FIG. 6 has been described with regard to the case in which the manual operation procedure constructor 106 analyzes similar manual operation sequences to estimate connections between nodes and thus to automatically construct the directional acyclic graph. However, manual operation sequences sometimes cannot be constructed merely by analyzing the event log data because manual operations for field devices include manual operations that are performed less frequently. For example, the event analyzing device 10 may be configured such that the user can correct the directional acyclic graph or create a new directional acyclic graph by manipulating a device such as a keyboard and a mouse included in the input device 10f of FIG. 2. For example, the user of the event analyzing device 10 corrects the directional acyclic graph by selecting a node or a connection line displayed on the display device 16 with a mouse or the like to bring the node or connection line into an editable state. Further, for example, the "Setting Value" screen, the "Duration" screen, and the "Time Lag" screen of FIG. 6 may be pop-up displayed superimposed on the image of the graph displayed by the display device 16.

Next, the manual operation procedure of the operator including execution conditions will be described with reference to FIG. 7. FIG. 7 is a diagram showing an exemplary manual operation procedure of the operator including execution conditions output by the event analyzing device according to the embodiment. FIG. 7 is a diagram in which the manual operation conditions estimated by the manual operation condition estimator 1083 are superimposed on the directional acyclic graph described with reference to FIG. 6.

Figure 7:
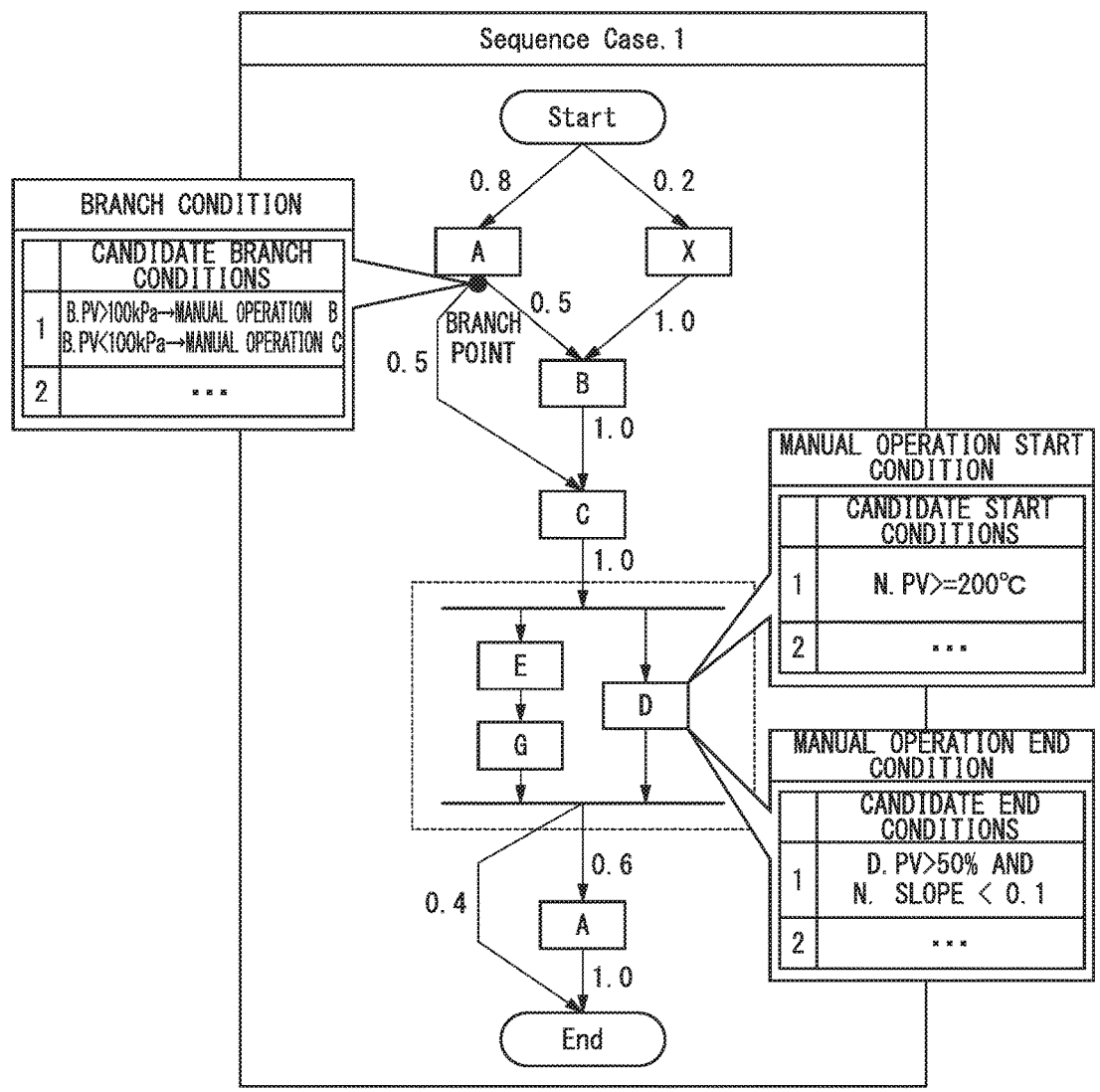
FIG. 7 is a diagram showing an exemplary manual operation procedure of an operator including an execution condition output by the event analyzing device according to the embodiment.

As shown in FIG. 7, node A has a branch connection that branches to node B or node C. The branch condition is a condition estimated based on process data when branching to the node B or the node C. A shown candidate branch condition "1" indicates that branching is made to the node B to perform manual operation B when a PV value "B. PV" is greater than 100 KPa and branching is made to the node C to perform manual operation C when the PV value "B. PV" is smaller than 100 KPa. The branch condition may sometimes be determined from a plurality of candidate branch conditions. For example, when the operator determines the next manual operation based on a plurality of process values, the candidate branch condition includes respective conditions of the process values. By estimating branch conditions based on process data in addition to the branch rates described with reference to FIG. 6, it is possible to facilitate the creation or update of an SOP for branch conditions of manual operations.

The node D has a manual operation start condition for starting the manual operation and a manual operation end condition for ending the manual operation. A shown candidate start condition "1" indicates that the manual operation of the node D starts when a PV value "N.PV" is 200° C. or higher. A candidate end condition "1" indicates that the manual operation of the node D ends when a PV value "D. PV" is greater than 50% and a PV value "N. slope" is less than 0.1. The manual operation start condition or the manual operation end condition may also include a plurality of candidate conditions. By estimating the manual operation start condition or the manual operation end condition based on process data in addition to the "Time Lag" and "Duration" described with reference to FIG. 6, it is possible to easily create or update an SOP for the manual operation start condition or the manual operation end condition.

The execution conditions of manual operations described with reference to FIG. 7 may be displayed, for example, by the user specifying corresponding nodes in the directional acyclic graph displayed on the display device 16 with a mouse or the like. The manual operation condition outputter 1084 may display displayable portions of execution conditions with icons of a predetermined shape or in a predetermined color to allow the user to visually see that the execution conditions are displayable.

Next, the operation of the event analyzing device 10 will be described with reference to FIG. 8. FIG. 8 is a sequence diagram showing an exemplary operation of the event analyzing device according to the embodiment.

As shown in FIG. 8, first, the user requests the manual operation condition outputter 1084 to display branch conditions (step S1). For example, the user requests that all branch conditions included in the directional acyclic graph displayed on the display device 16 be displayed. Here, the user may also specify a branch connection portion of a node displayed on the display device 16 with a mouse or the like to request that corresponding branch conditions be displayed.

After the process of step S1 is performed, the manual operation condition outputter 1084 requests the manual operation condition estimator 1083 to estimate branch conditions (step S2).

After the process of step S2 is performed, the manual operation condition estimator 1083 acquires information of a time zone during which branch manual operations were performed from the manual operation procedure constructor 106 (step S3). The acquisition of the time zone information may be performed such that, for example, the manual operation condition estimator 1083 designates a node including a branch manual operation to the manual operation procedure constructor 106 and the manual operation procedure constructor 106 provides information of the time zone from event log data regarding the designated node.

After the process of step S3 is performed, the manual operation condition estimator 1083 narrows down tags related to the tag of the branch manual operation (step S4). The relating tags may be narrowed down, for example, by analyzing the relationship between control devices based on the configuration information of the plant such as a piping and instrumentation diagram (P & ID), a process flow diagram (PFD), a control loop, definition information of the monitoring screen, or the like. Here, the P & ID is a graphical representation of the configuration information such as installation positions of pipes and field devices in the plant. The PFD is a graphical representation of the configuration information of the process flow from raw materials to products. The definition information of the monitoring screen is the configuration information of process data included in the monitoring screen displayed on the display device 16 when a process including branch conditions is performed. In the plant, the operator determines a branch destination manual operation by identifying these pieces of information. In the process of step S4, tag IDs of field devices related to these pieces of configuration information of the plant are extracted. The relating tags may be narrowed down by a manual operation history of the operator recorded in the maintenance record or the like.

After the process of step S4 is performed, the manual operation condition estimator 1083 requests the process database 19 to acquire process data of the field devices related to the narrowed-down relating tags to acquire the process data within the time zone acquired in step S3 (step S5).

After the process of step S5 is performed, the manual operation condition estimator 1083 extracts the feature amount from the acquired process data of each branch (step S6). The feature amount is, for example, a numerical value such as a numerical value of the process data or an average value calculated from numerical values of the process data. Details of the feature amount will be described later with reference to FIG. 10A and FIG. 10B.

After the process of step S6 is performed, the manual operation condition estimator 1083 estimates branch conditions (step S7). The branch conditions can be estimated, for example, using the feature amount of process data in a time zone immediately prior to each branch. Details of the estimation of branch conditions will be described later with reference to FIG. 9A, FIG. 9B, and so on.

The manual operation condition outputter 1084 notifies the user of the branch conditions estimated in the process of step S7 via the display device 16 as described above with reference to FIG. 7. Thus, the user of the event analyzing device 10 can refer to the manual operation procedure from the display device 16, such that the user can compare the manual operation procedure displayed on the display device 16 with the description of the existing SOP or can acquire accurate information for creating a new SOP.

Either unit manual operations or basic unit manual operations may be used as elements of the manual operation sequence. When the elements of the manual operation sequence are unit manual operations, the manual operation intention of the operator can be easily understood from the manual operation sequence. On the other hand, when the elements of the manual operation sequence are basic unit manual operations, the manual operation sequence represents manual operations of the operator in more detail. The elements of the manual operation sequence may be appropriately selected according to the SOP to be created or modified.

Figures 9A, 9B:
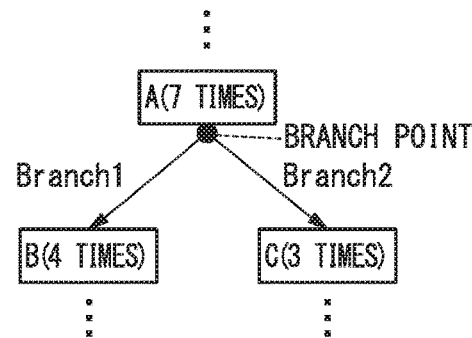
FIG. 9A and FIG. 9B are diagrams showing exemplary input data for extracting a manual operation branch condition in the event analyzing device according to the embodiment.

Next, a method of estimating branch conditions of manual operations will be described with reference to FIG. 9A and FIG. 9B. FIG. 9A and FIG. 9B are diagrams showing exemplary input data for extracting a branch condition of a manual operation in the event analyzing device according to the embodiment.

Specifically, FIG. 9A shows a branch manual operation procedure in the manual operation sequence. FIG. 9B shows periods of time immediately prior to branch manual operations extracted from the event log data.

In FIG. 9A, node A has a branch connection that branches to node B or node C. Let "Branch 1" be a branch to the node B and "Branch 2" be a branch to the node C. The manual operation of the node A has been performed a total of seven times. Here, branching is made to Branch 1 a total of 4 times and branching is made to Branch 2 a total of 3 times. FIG. 9B shows the extracted periods of time immediately before the seven manual operations.

In FIG. 9B, a data item of "No" indicates the number of manual operations performed. A data item of "Branch" indicates "Branch 1" which is a branch to the node B or "Branch 2" which is a branch to the node C. A data item of "Period of Time Immediately Before Branch Manual operation" indicates a period of time of 20 minutes immediately before the branch manual operation. Here, "End Time" indicates the time when a branch destination manual operation is performed. The time when the manual operation is performed is extracted from the event log data. In FIG. 9A and FIG. 9B, it is assumed that the period of time immediately before the branch manual operation is a period of time of 20 minutes from 20 minutes ago before the branch manual operation is performed until the manual operation is performed. When the manual operation sequence includes a plurality of branches, the period of time immediately before the branch manual operation is extracted for each of the branches in the same manner.

Next, a method of extracting trend feature amounts from process data will be described with reference to FIG. 10A and FIG. 10B. FIG. 10A and FIG. 10B are diagrams showing an example in which trend feature amounts are extracted from process data in the event analyzing device according to the embodiment.

Specifically, FIG. 10A shows transitions of PV values and the periods of time immediately before branching described with reference to FIG. 9A and FIG. 9B. FIG. 10B shows feature amounts for the periods of time immediately before branching.

In FIG. 10A, the horizontal axis of the graph is the time axis and pairs of broken lines indicate the periods of times of 20 minutes from the start time to the end time for the "No" data items of "No. 1" to "No. 7" in FIG. 9B. The vertical axis of the graph represents a value of "X. PV" and a value of "Y. PV" which are process data values regarding the relating tags narrowed down by the manual operation condition estimator 1083. The manual operation condition estimator 1083 acquires the value of "X. PV" and the value of "Y. PV" for the periods of time immediately before branching.

In FIG. 10B, data items of "No" and "Branch" correspond respectively to the data items of "No" and "Branch" of FIG. 9B. Data items of "X-average," "X-slope," "X-standard deviation," "Y-average," "Y- slope," and "Y-standard deviation" exemplify feature amounts calculated from the process data of "X. PV" and "Y. PV" of FIG. 10A.

The data item of "X_average" is an average value of "X. PV" in the period of time immediately before branching. The average value can be calculated, for example, as an arithmetic mean, a geometric mean, a harmonic mean, or the like. The data item of "X_slope" is the slope of an approximate straight line which is a straight line approximating the value of "X. PV" in the period of time immediately before branching. The approximate straight line can be calculated, for example, by the least squares method or the like. The data item of "X_standard deviation" is the standard deviation of the value of "X. PV" in the period of time immediately before branching. "Y_average," "Y_slope" and "Y_standard deviation" can be calculated in the same manner. The method of calculating feature amounts is not limited to the above and may be, for example, based on a maximum value, a minimum value, an effective value, or the like. Since the feature amounts are values which influences the branch decision of the manual operation of the operator, the feature amounts include, for example, non-numerical states of the plant detectable by the control system 17 such as "open" or "closed" states of valves.

Figure 11:
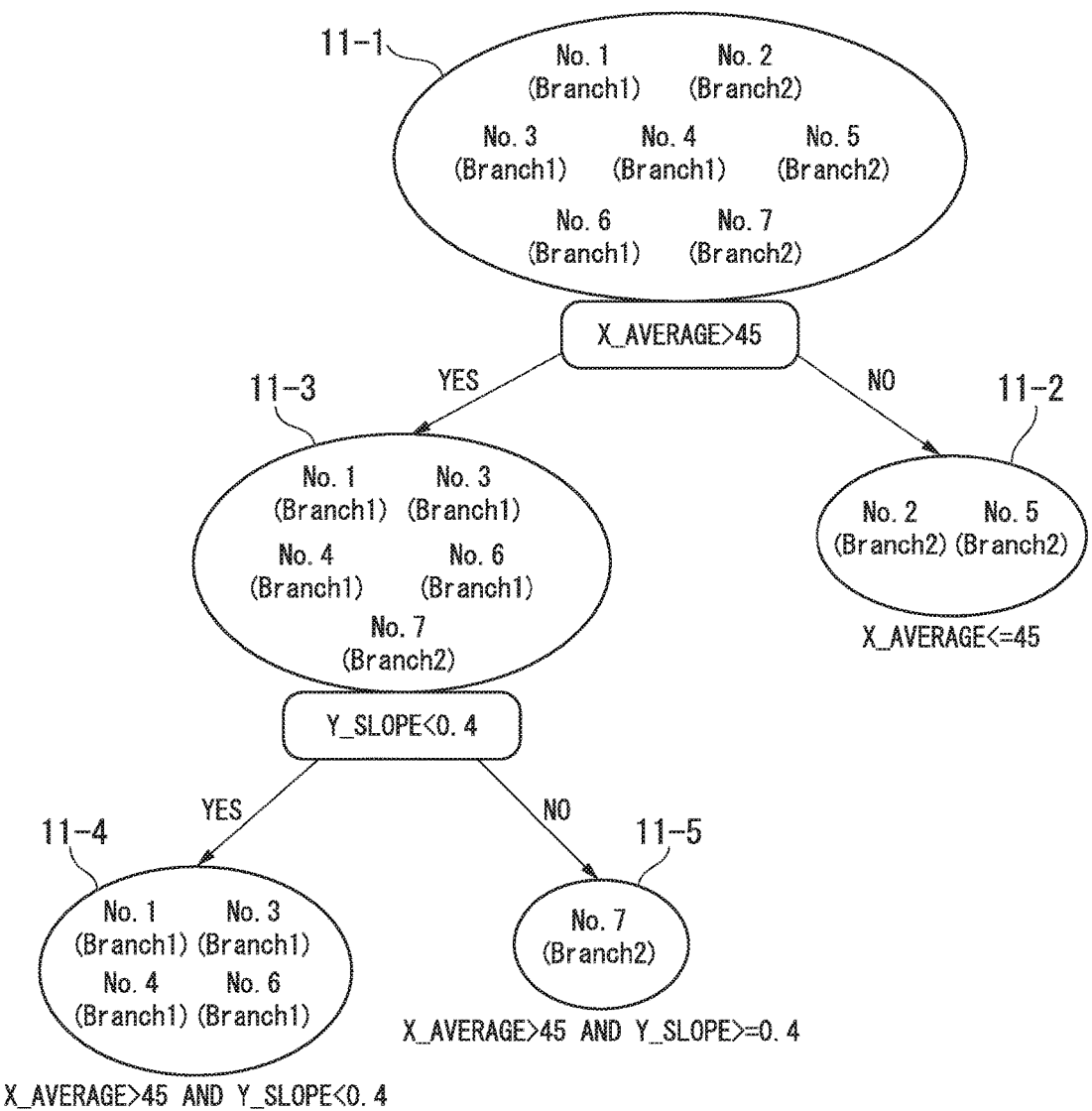
FIG. 11 is a diagram showing an exemplary decision tree generated to estimate a branch condition in the event analyzing device according to the embodiment.

Next, a method of estimating branch conditions will be described with reference to FIG. 11. FIG. 11 is a diagram illustrating an exemplary decision tree generated to estimate branch conditions in the event analyzing device according to the embodiment. The decision tree for estimating branch conditions can be generated, for example, based on a decision tree learning algorithm such as ID3 (Iterative Dichotomiser 3) or CART.

To generate the decision tree of FIG. 11, classification is performed such that manual operations of a branch destination are associated with a feature amount at that time. A feature amount which is to be associated with the classification of the branch destination is selected from a plurality of feature amounts such that manual operations of the same branch destination are classified into the same group as much as possible through classification by the feature amount. The feature amount can be selected based on an evaluation value such as a Gini coefficient/entropy. The classification by the feature amount is performed a plurality of times until manual operations of different branch destinations are all classified into different groups.

Group 11-1 shows a group before classification. That is, branches of No. 1 to No. 7 are mixed as the same class (group). Here, when attempting to classify the branches by all feature amounts ("X_average," "X_slope," "X_standard deviation," "Y_average," "Y_slope," and "Y_standard deviation"), the branches can be classified by the feature amount "X_average" into a Branch 2-only group 11-2 including the branches of "No. 2" and "No. 5" in which no branches of Branch 1 are not mixed according to whether or not the value of the feature amount "X_average" is greater than 45 as a threshold value.

Next, when attempting to classify the branches of the group 11-3, remaining after the classification of the group 11-2, which include the branches of "No. 1," "No. 3," "No. 4," "No. 5," and "No. 6" that satisfy the condition of "X_average>45", by the feature amounts other than the feature amount "X_average" that has already been used, the branches of the group 11-3 can be classified by the feature amount "Y_slope" into a Branch 1-only group 11-4 including the branches of "No. 1," "No. 3," "No. 4," and "No. 6" and a Branch 2-only group 11-5 including the branch of "No. 7" according to whether or not the value of the feature amount "Y_slope" is less than 0.4. At this stage, all branches of Branch 1 and Branch 2 can be classified separately. That is, it is possible to extract a classification condition ("X_average>45" AND "Y_slope<0.4") of the group of Branch 1 from the decision tree of FIG. 11 and to estimate the extracted classification condition as a condition for executing a manual operation of Branch 1. Further, it is possible to extract a classification condition ("X_average≤45" OR "X_average>45" AND "Y_slope≥0.4") of the group of Branch 2 from the decision tree of FIG. 11 and to estimate the extracted classification condition as a condition for executing a manual operation of Branch 2.

FIG. 11 has been described with regard to the case in which the decision tree is generated until all manual operations with different branch destinations are classified into different groups. However, the number of divisions, the threshold value of an evaluation value such as a Gini coefficient/entropy, or the like may be limited to extract branch conditions. Branch conditions may also be extracted respectively based on a plurality of decision trees and may be presented to the user as a plurality of candidate branches. In addition to the decision tree, a learning algorithm of a classifier such as a support vector machine (SVM) or discrimination analysis may be used as a method for selecting feature amounts and their threshold values such that manual operations of the same branch destination are classified into the same group as much as possible.

The user of the event analyzing device 10 can easily generate or update the SOP of branch related manual operations based on the extracted branch conditions.

Figures 12A, 12B:
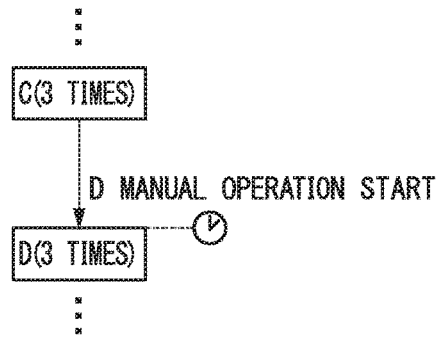
FIG. 12A and FIG. 12B are diagrams showing exemplary input data for extracting a manual operation start condition in the event analyzing device according to the embodiment.

Next, extraction of a manual operation start condition will be described with reference to FIG. 12A and FIG. 12B. FIG. 12A and FIG. 12B are diagrams showing exemplary input data for extracting a manual operation start condition in the event analyzing device according to the embodiment.

Specifically, FIG. 12A shows a manual operation procedure regarding start of a manual operation in the manual operation sequence. FIG. 12B shows waiting periods of time or execution periods of time extracted from event log data.

FIG. 12A shows a manual operation procedure in which nodes C and D are connected in series. Each of the nodes is executed three times. It is assumed that the manual operation of the node D sometimes includes a waiting period of time after the manual operation of the node C ends. Waiting refers to, for example, a state in which the manual operation of the node D is not performed for a predetermined period of time or more after the manual operation of the node C ends. The operator checks whether the process data is in a predetermined state and performs the manual operation of the node D or waits for the manual operation. Here, it is assumed that a condition for starting the manual operation of the node D is estimated when the manual operation of the node D has not been performed for 10 minutes or more after the manual operation of the node C ends.

In FIG. 12B, a data item of "No" indicates the number of manual operations performed. A data item of "Waiting/Execution" indicates "Waiting" when the operator has waited (i.e., when 10 minutes or more have elapsed from the end of the manual operation of the node C until the manual operation of the node D starts) and indicates "Execution" when the operator has not waited (i.e., when less than 10 minutes have elapsed from the end of the manual operation of the node C until the manual operation of the node D starts).

The data item of "Waiting/Execution Period of Time" indicates a period of time determined for "Waiting" of the data item of "Waiting/Execution" and a period of time determined for "Execution" of the data item of "Waiting/Execution." The period of time determined for "Waiting" is a period of time in which the operator has determined to wait until the manual operation of the node D starts from the end of the manual operation of the node C. In FIG. 12A and FIG. 12B, "Start Time" is the time when the manual operation of the node C ends and "End Time" is 5 minutes after the start time. On the other hand, the period of time determined for "Execution" is a period of time in which the operator has determined to execute the manual operation of the node D before the manual operation of the node D starts, where "End Time" is the time when the manual operation of the node D starts and "Start Time" is 5 minutes before the end time.

The method of setting the data item of "Waiting/Execution Period of Time" is not limited to the above as long as it sets a period of time presumed as one for which the operator has determined to wait for or execute the manual operation. For example, the method of setting the start time and the end time may be changed according to the type of the manual operation that has ended (i.e., the manual operation of the node C) and the type of the manual operation to be started (i.e., the manual operation of the node D).

After completion of the setting of "Waiting/Execution Period of Time" of FIG. 12A and FIG. 12B, a feature amount of the process data regarding the waiting or execution of the manual operation is calculated similar to the method described with reference to FIG. 10A and FIG. 10B, and a condition (a waiting condition or an execution condition) of the feature amount for the classification of waiting or execution is extracted similar to the method described with reference to FIG. 11.

The user of the event analyzing device 10 can easily generate or update the SOP relating to the waiting or execution manual operation procedure based on the extracted waiting or execution condition.

Figures 13A, 13B:
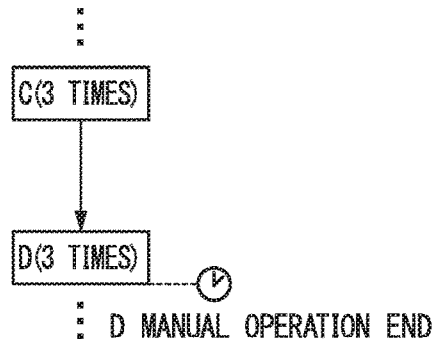
FIG. 13A and FIG. 13B are diagrams showing exemplary input data for extracting a manual operation end condition in the event analyzing device according to the embodiment.

Next, extraction of a manual operation end condition will be described with reference to FIG. 13A and FIG. 13B. FIG. 13A and FIG. 13B are diagrams showing exemplary input data for extracting a manual operation end condition in the event analyzing device according to the embodiment.

Specifically, FIG. 13A shows a manual operation procedure regarding end of a manual operation in the manual operation sequence. FIG. 13B shows manual operation durations or manual operation end periods of time extracted from event log data.

FIG. 13A shows a manual operation procedure in which nodes C and D are connected in series. Each of the nodes is executed three times. It is assumed that the manual operation of the node D sometimes includes determination as to whether the manual operation of the node D is continuing or has ended after the manual operation of the node D starts. Here, "continuing" refers to, for example, a state in which the manual operation of the node D is continuing for a predetermined period of time or more after the manual operation of the node D starts. The operator checks whether the process data has become a predetermined state and continues or ends the manual operation of the node D. Here, it is assumed that a condition for ending the manual operation of the node D is estimated when the manual operation of the node D has been performed for 10 minutes or more after the manual operation of the node D starts.

In FIG. 13B, a data item of "No" indicates the number of manual operations performed. A data item of "Continuance/End" indicates "Continuance" when the manual operation is continuing (i.e., when 10 minutes or more have elapsed from the start of the manual operation of the node D until the manual operation of the node D ends) and indicates "End" when the manual operation has ended (i.e., when less than 10 minutes have elapsed from the start of the manual operation of the node D until the manual operation of the node D ends).

The data item of "Continuance/End Period of Time" indicates a period of time determined for "Continuance" of the data item of "Continuance/End" and a period of time determined for "End" of the data item of "Continuance/End." The period of time determined for "Continuance" is a period of time in which the operator has determined to continue the manual operation of the node D until the manual operation of the node D ends from the start of the manual operation of the node D. In FIG. 13A and FIG. 13B, "Start Time" is the time when the manual operation of the node D starts and "End Time" is 5 minutes after the start time. On the other hand, the period of time determined for "End" is a period of time in which the operator has determined to end the manual operation of the node D before the manual operation of the node D ends, where "End Time" is the time when the manual operation of the node D ends and "Start Time" is 5 minutes before the end time.

The method of setting the data item of "Continuance/End Period of Time" is not limited to the above as long as it sets a period of time presumed as one for which the operator has determined to continue or end the manual operation. For example, the method of setting the start time and the end time may be changed according to the type of the manual operation that is continuing or has ended (i.e., the manual operation of the node D).

After completion of the setting of "Continuance/End Period of Time" of FIG. 13A and FIG. 13B, a feature amount of the process data regarding the continuance or end of the manual operation is calculated similar to the method described with reference to FIG. 10A and FIG. 10B, and a condition (a continuance condition or an end condition) of the feature amount for classifying the continuance or end is extracted similar to the method described with reference to FIG. 11.

The user of the event analyzing device 10 can easily generate or update the SOP relating to the continuance or end manual operation procedure based on the extracted continuance or end condition.

As described above, the event analyzing device according to the present embodiment includes an event collector configured to collect log data of a manual operation event performed by an operator of a plant, an event analyzer configured to analyze a manual operation method or a manual operation intention of the manual operation event based on the collected log data, a manual operation sequence extractor configured to extract the analyzed manual operation method or manual operation intention of each predetermined period as a manual operation sequence in order of time, a manual operation sequence classifier configured to classify the manual operation sequences in which manual operations are in a similar order from among the extracted manual operation sequences, a manual operation procedure constructor configured to construct a manual operation procedure of the operator based on the classified manual operation sequences, a process data collector configured to collect process data of the plant, and a manual operation condition estimator configured to estimate an execution condition under which manual operations of the constructed manual operation procedure are performed, whereby it is possible to automatically extract criteria for performing manual operations and to support standardization of manual operations.

The above-described event analyzing device 10 may be any device having the above-described functions and may be realized, for example, as a system including a combination of a plurality of devices communicably connected to each other. The event analyzing device 10 may also be realized by some of the functions of the control system 17 or the like described with reference to FIG. 1.

As described above, the event analyzing device according to the present embodiment includes an event collection step including collecting log data of a manual operation event performed by an operator of a plant, an event analysis step including analyzing a manual operation method or a manual operation intention of the manual operation event based on the collected log data, a manual operation sequence extraction step including extracting the analyzed manual operation method or manual operation intention of each predetermined period as a manual operation sequence in order of time, a manual operation sequence classification step including classifying manual operation sequences in which manual operations are in a similar order from among the extracted manual operation sequences, a manual operation procedure construction step including constructing a manual operation procedure of the operator based on the classified manual operation sequences, a process data collection step including collecting process data of the plant, and a manual operation condition estimation step including estimating an execution condition under which manual operations of the constructed manual operation procedure are performed, whereby it is possible to automatically extract criteria for performing manual operations and to support standardization of manual operations.

In the event analyzing method described above, the execution order of the steps is not limited and the steps may be performed in any order. The event analyzing method may be performed, for example, by a plurality of devices connected via a network or the like.

The various processes of the present embodiment described above may be performed by recording a program for realizing the functions of the devices described in the present embodiment on a computer-readable recording medium and causing a computer system to read and execute the program recorded on the recording medium. The "computer system" referred to here may include an OS or hardware such peripheral devices. When a WWW system is used, the "computer system" also includes a website providing environment (or display environment). The "computer-readable recording medium" refers to a flexible disk, a magneto-optical disk, a ROM, a writable nonvolatile memory such as a flash memory, a portable medium such as a CD-ROM, or a storage device such as a hard disk provided in a computer system.

The "computer readable recording medium" includes one that holds the program for a certain period of time, like a volatile memory (for example, a dynamic random access memory (DRAM)) provided in a computer system which serves as a server or a client when the program has been transmitted via a network such as the Internet or a communication line such as a telephone line. The program may also be transmitted from a computer system in which the program is stored in a storage device or the like to another computer system via a transmission medium or by transmission waves in the transmission medium. Here, the "transmission medium" for transmitting the program refers to a medium having a function of transmitting information, like a network (a communication network) such as the Internet and a communication line (a communication wire) such as a telephone line. The program may be one for realizing some of the above-described functions. The program may also be a so-called differential file (differential program) which realizes the above-described functions in combination with a program already recorded in the computer system.

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. An event analyzing device connected to a historian which stores log data of manual operation event and process data, the log data of the manual operation event representing manual operation performed by an operator to a device in a plant, the process data representing physical quantity data in processes of the plant, the event analyzing device comprising:
    a hardware-processor configured to execute an event analysis program to implement:
    an event collector configured to collect the log data of the manual operation event from the historian;
    an event analyzer configured to extract a basic unit manual operation indicating a manual operation method of the operator included in the log data collected by the event collector, and configured to extract a unit manual operation indicating a manual operation intention of the operator included in the basic unit manual operation to analyze the manual operation method or the manual operation intention;
    a manual operation sequence extractor configured to generate a manual operation sequence in which pieces of basic unit manual operation data or unit manual operation data are linked in order of time to extract the manual operation sequence, the basic unit manual operation data indicating the basic unit manual operation extracted by the event analyzer, the unit manual operation data indicating the unit manual operation extracted by the event analyzer;
    a manual operation sequence classifier configured to calculate a degree of similarity of manual operation sequences based on the manual operation intention and an order of the unit manual operation included in the manual operation sequence extracted by the manual operation sequence extractor, and configured to classify the manual operation sequences whose the degree of similarity is high as one type;
    a manual operation procedure constructor configured to construct a manual operation procedure of the operator by generating manual operation procedure data indicating the manual operation procedure of the operator based on the manual operation sequences classified into a same type by the manual operation sequence classifier;
    a manual operation procedure outputter configured to output the manual operation procedure constructed by the manual operation procedure constructor to a display device to display the manual operation procedure on a display device;
    a process data collector configured to collect the process data of the plant from the historian;
    a manual operation condition estimator configured to extract a feature amount of the process data collected by the process data collector to estimate an execution condition under which manual operations of the manual operation procedure constructed by the manual operation procedure constructor are performed based on the feature amount of the process data; and
    a manual operation condition outputter configured to superimpose the execution condition estimated by the manual operation condition estimator on the manual operation procedure output by the manual operation procedure outputter to display a standard operation procedure on the display device.

2. The event analyzing device according to claim 1, wherein the manual operation condition estimator is configured to extract features amount of a plurality of the process data collected by the process data collector, and the manual operation condition estimator is configured to estimate the execution condition based on a relation between the extracted features amount and the manual operation.

3. The event analyzing device according to claim 2, wherein the manual operation condition estimator is configured to evaluate the relation between the extracted features amount and the manual operation in a plurality of stages to estimate the execution condition.

4. The event analyzing device according to claim 1, wherein the manual operation condition estimator is configured to estimate a start condition for starting the manual operation.

5. The event analyzing device according to claim 1, wherein the manual operation condition estimator is configured to estimate an end condition for ending the manual operation.

6. The event analyzing device according to claim 1, wherein the manual operation condition estimator is configured to estimate a branch condition in which the manual operation branches.

7. The event analyzing device according to claim 1, wherein the manual operation condition estimator is configured to estimate any one of a start condition for starting the manual operation, an end condition for ending the manual operation, and a branch condition in which the manual operation branches based on at least one of an average value of the process data, a slope of the process data, and a standard deviation of the process data.

8. The event analyzing device according to claim 1, wherein the manual operation method represents a method of the manual operation performed by the operator to a field device installed in the plant.

9. The event analyzing device according to claim 1, wherein the manual operation intention represents an intention of the manual operation performed by the operator to a field device installed in the plant.

10. An event analyzing system comprising:
an event analyzing device connected to a historian which stores log data of manual operation event and process data, the log data of the manual operation event representing manual operation performed by an operator to a device in a plant, the process data representing physical quantity data in processes of the plant, the event analyzing device comprising:
    a hardware-processor configured to execute an event analysis program to implement:

an event collector configured to collect the log data of the manual operation event from the historian;

an event analyzer configured to extract a basic unit manual operation indicating a manual operation method of the operator included in the log data collected by the event collector, and configured to extract a unit manual operation indicating a manual operation intention of the operator included in the basic unit manual operation to analyze the manual operation method or the manual operation intention;

a manual operation sequence extractor configured to generate a manual operation sequence in which pieces of basic unit manual operation data or unit manual operation data are linked in order of time to extract the manual operation sequence, the basic unit manual operation data indicating the basic unit manual operation extracted by the event analyzer, the unit manual operation data indicating the unit manual operation extracted by the event analyzer;

a manual operation sequence classifier configured to calculate a degree of similarity of manual operation sequences based on the manual operation intention and an order of the unit manual operation included in the manual operation sequence extracted by the manual operation sequence extractor, and configured to classify the manual operation sequences whose the degree of similarity is high as one type;

a manual operation procedure constructor configured to construct a manual operation procedure of the operator by generating manual operation procedure data indicating the manual operation procedure of the operator based on the manual operation sequences classified into a same type by the manual operation sequence classifier;

a manual operation procedure outputter configured to output the manual operation procedure constructed by the manual operation procedure constructor to a display device to display the manual operation procedure on a display device;

a process data collector configured to collect the process data of the plant from the historian;

a manual operation condition estimator configured to extract a feature amount of the process data collected by the process data collector to estimate an execution condition under which manual operations of the manual operation procedure constructed by the manual operation procedure constructor are performed based on the feature amount of the process data; and a manual operation condition outputter configured to superimpose the execution condition estimated by the manual operation condition estimator on the manual operation procedure output by the manual operation procedure outputter to display a standard operation procedure on the display device.

11. The event analyzing system according to claim 10, wherein the manual operation condition estimator is configured to extract features amount of a plurality of the process data collected by the process data collector, and the manual operation condition estimator is configured to estimate the execution condition based on a relation between the extracted features amount and the manual operation.

12. The event analyzing system according to claim 11, wherein the manual operation condition estimator is configured to evaluate the relation between the extracted features amount and the manual operation in a plurality of stages to estimate the execution condition.

13. The event analyzing system according to claim 10, wherein the manual operation condition estimator is configured to estimate a start condition for starting the manual operation.

14. The event analyzing system according to claim 10, wherein the manual operation condition estimator is configured to estimate an end condition for ending the manual operation.

15. The event analyzing system according to claim 10, wherein the manual operation condition estimator is configured to estimate a branch condition in which the manual operation branches.

16. The event analyzing system according to claim 10, wherein the manual operation condition estimator is configured to estimate any one of a start condition for starting the manual operation, an end condition for ending the manual operation, and a branch condition in which the manual operation branches based on at least one of an average value of the process data, a slope of the process data, and a standard deviation of the process data.

17. The event analyzing system according to claim 10, wherein the manual operation method represents a method of the manual operation performed by the operator to a field device installed in the plant.

18. The event analyzing system according to claim 10, wherein the manual operation intention represents an intention of the manual operation performed by the operator to a field device installed in the plant.

19. An event analyzing method of an event analyzing device connected to a historian which stores log data of manual operation event and process data, the log data of the manual operation event representing manual operation performed by an operator to a device in a plant, the process data representing physical quantity data in processes of the plant, the event analyzing method comprising:

collecting, by an event collector, the log data of the manual operation event from the historian;

extracting, by an event analyzer, a basic unit manual operation indicating a manual operation method of the operator included in the log data collected by the event collector, and configured to extract a unit manual operation indicating a manual operation intention of the operator included in the basic unit manual operation to analyze the manual operation method or the manual operation intention;

generating, by a manual operation sequence extractor, a manual operation sequence in which pieces of basic unit manual operation data or unit manual operation data are linked in order of time to extract the manual operation sequence, the basic unit manual operation data indicating the basic unit manual operation extracted by the event analyzer, the unit manual operation data indicating the unit manual operation extracted by the event analyzer;

calculating, by a manual operation sequence classifier, a degree of similarity of manual operation sequences based on the manual operation intention and an order of the unit manual operation included in the manual operation sequence extracted by the manual operation sequence extractor, and configured to classify the manual operation sequences whose the degree of similarity is high as one type;

constructing, by a manual operation procedure constructor, a manual operation procedure of the operator by generating manual operation procedure data indicating the manual operation procedure of the operator based on the manual operation sequences classified into a same type by the manual operation sequence classifier;

outputting, by a manual operation procedure outputter, the manual operation procedure constructed by the manual operation procedure constructor to a display device to display the manual operation procedure on a display device;

collecting, by a process data, the process data of the plant from the historian;

extracting, by a manual operation condition estimator, a feature amount of the process data collected by the process data collector to estimate an execution condition under which manual operations of the manual operation procedure constructed by the manual operation procedure constructor are performed based on the feature amount of the process data; and superimposing, by a manual operation condition outputter, the execution condition estimated by the manual operation condition estimator on the manual operation procedure output by the manual operation procedure outputter to display a standard operation procedure on the display device.

20. A non-transitory computer readable storage medium storing one or more event analyzing programs configured for execution by a computer of an event analyzing device connected to a historian which stores log data of manual operation event and process data, the log data of the manual operation event representing manual operation performed by an operator to a device in a plant, the process data representing physical quantity data in processes of the plant, the one or more programs comprising instructions for:

collecting, by an event collector, the log data of the manual operation event from the historian;

extracting, by an event analyzer, a basic unit manual operation indicating a manual operation method of the operator included in the log data collected by the event collector, and configured to extract a unit manual operation indicating a manual operation intention of the operator included in the basic unit manual operation to analyze the manual operation method or the manual operation intention;

generating, by a manual operation sequence extractor, a manual operation sequence in which pieces of basic unit manual operation data or unit manual operation data are linked in order of time to extract the manual operation sequence, the basic unit manual operation data indicating the basic unit manual operation extracted by the event analyzer, the unit manual operation data indicating the unit manual operation extracted by the event analyzer;

calculating, by a manual operation sequence classifier, a degree of similarity of manual operation sequences based on the manual operation intention and an order of the unit manual operation included in the manual operation sequence extracted by the manual operation sequence extractor, and configured to classify the manual operation sequences whose the degree of similarity is high as one type;

constructing, by a manual operation procedure constructor, a manual operation procedure of the operator by generating manual operation procedure data indicating the manual operation procedure of the operator based on the manual operation sequences classified into a same type by the manual operation sequence classifier;

outputting, by a manual operation procedure outputter, the manual operation procedure constructed by the manual operation procedure constructor to a display device to display the manual operation procedure on a display device;

collecting, by a process data, the process data of the plant from the historian;

extracting, by a manual operation condition estimator, a feature amount of the process data collected by the process data collector to estimate an execution condition under which manual operations of the manual operation procedure constructed by the manual operation procedure constructor are performed based on the feature amount of the process data; and superimposing, by a manual operation condition outputter, the execution condition estimated by the manual operation condition estimator on the manual operation procedure output by the manual operation procedure outputter to display a standard operation procedure on the display device.

* * * * *